United States Patent
Huang et al.

(10) Patent No.: US 12,015,505 B2
(45) Date of Patent: Jun. 18, 2024

(54) UPLINK TRANSMISSION INSTRUCTION METHOD, TERMINAL, BASE STATION AND COMPUTER STORAGE MEDIUM

(71) Applicant: DATANG MOBILE COMMUNICATIONS EQUIPMENT CO., LTD., Beijing (CN)

(72) Inventors: Qiuping Huang, Beijing (CN); Runhua Chen, Beijing (CN); Qiubin Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 575 days.

(21) Appl. No.: 17/268,601

(22) PCT Filed: Aug. 16, 2019

(86) PCT No.: PCT/CN2019/101187
§ 371 (c)(1),
(2) Date: Feb. 16, 2021

(87) PCT Pub. No.: WO2020/035069
PCT Pub. Date: Feb. 20, 2020

(65) Prior Publication Data
US 2021/0351960 A1    Nov. 11, 2021

(30) Foreign Application Priority Data
Aug. 17, 2018  (CN) .................. 201810943509.8

(51) Int. Cl.
*H04L 5/00*     (2006.01)
*H04L 25/02*    (2006.01)
(Continued)

(52) U.S. Cl.
CPC ........ *H04L 25/0226* (2013.01); *H04L 5/0051* (2013.01); *H04W 72/046* (2013.01); *H04W 72/23* (2023.01); *H04W 72/542* (2023.01)

(58) Field of Classification Search
CPC ............. H04L 25/0226; H04L 5/0051; H04W 72/542; H04W 72/23; H04W 72/046
(Continued)

(56) References Cited

U.S. PATENT DOCUMENTS

2017/0331602 A1   11/2017  Hugl et al.
2018/0206132 A1    7/2018  Guo et al.
2019/0215857 A1*   7/2019  Lin .................. H04L 5/0055

FOREIGN PATENT DOCUMENTS

CN   103036663 A   4/2013
CN   107889256 A   4/2018
(Continued)

OTHER PUBLICATIONS

CATT, "Remaining issues on codebook based UL transmission", 3GPP TSG RAN WG1 Meeting AH 1801, Vancouver, Canada, Jan. 22-26, 2018, total 8 pages, R1-1800237.
(Continued)

*Primary Examiner* — Christopher R Crompton
(74) *Attorney, Agent, or Firm* — Kilpatrick Townsend & Stockton LLP

(57) ABSTRACT

The uplink transmission instruction method, applied to a network side device, comprises: sending a configuration message to a terminal, and the configuration message is used
(Continued)

for configuring at least two sounding reference signal (SRS) resource sets for the terminal, and the SRS resource set is used for acquiring channel state information (CSI) of a first uplink transmission mode; receiving an SRS under the configuration message sent by the terminal, and determining, according to the received SRS, an uplink transmission parameter of a first uplink signal; and sending the determined uplink transmission parameter to the terminal to instruct the terminal to transmit the first uplink signal according to the uplink transmission parameter.

18 Claims, 5 Drawing Sheets

(51) Int. Cl.
    *H04W 72/044*    (2023.01)
    *H04W 72/23*     (2023.01)
    *H04W 72/542*    (2023.01)

(58) Field of Classification Search
    USPC .......................................................... 370/329
    See application file for complete search history.

(56) References Cited

FOREIGN PATENT DOCUMENTS

| | | | |
|---|---|---|---|
| CN | 108023697 | A | 5/2018 |
| CN | 108092754 | A | 5/2018 |
| CN | 108111268 | A | 6/2018 |
| CN | 108111272 | A | 6/2018 |
| CN | 108111282 | A | 6/2018 |
| CN | 108111283 | A | 6/2018 |
| WO | 2012177207 | A1 | 12/2012 |
| WO | 2014171869 | A1 | 10/2014 |
| WO | 2018128504 | A1 | 7/2018 |

OTHER PUBLICATIONS

CATT, "Remaining issues on codebook based UL transmission", 3GPP TSG RAN WG1 Meeting #92, Athens, Greece, Feb. 26-Mar. 2, 2018, total 11 pages, R1-1801716.

Nokia et al., "Remaining issues on UL codebook based transmission", 3GPP TSG-RAN WG1 Meeting #92bis, Sanya, P.R. China, Apr. 16-20, 2018, total 4 pages, R1-1805101.

Ericsson, "Corrections for Codebook Based UL MIMO", 3GPP TSG-RAN Meeting #92, Athens, Greece, Feb. 26-Mar. 2, 2018, total 8 pages, R1-1802737.

* cited by examiner

UPLINK TRANSMISSION INSTRUCTION METHOD, TERMINAL, BASE STATION AND COMPUTER STORAGE MEDIUM

This application is a national phase entry under 35 U.S.C. § 371 of International Application No. PCT/CN2019/101187, filed on Aug. 16, 2019, which claims the priority from Chinese Patent Application No. 201810943509.8, filed with the China National Intellectual Property Administration on Aug. 17, 2018 and entitled "Uplink Transmission Instruction Method, Terminal, Base Station and Computer Storage Medium", the entire content of which is hereby incorporated by reference.

FIELD

This application relates to the field of communication technology, and in particular to an uplink transmission instruction method, a terminal, a base station and a computer storage medium.

BACKGROUND

At present, a base station configures a Sounding Reference Signal (SRS) resource set for a terminal. The uplink sending beam is semi-statically configured for each SRS resource or one SRS resource set. When it is necessary to change the uplink sending beam of one SRS resource, the Radio Resource Control (RRC) reconfiguration is required, that is, it cannot be adjusted flexibly. However, the delay of the RRC reconfiguration is as high as 100-200 ms, which may affect the performance of analog beamforming in some application scenarios.

BRIEF SUMMARY

Embodiments of the application provide an uplink transmission instruction method, a terminal, a base station and a computer storage medium, to provide a new uplink transmission instruction method to flexibly perform the dynamic indication of the uplink sending beam, improving the beam adjustment efficiency.

In a first aspect, an uplink transmission instruction method applied to a network side device is provided, which includes:
  sending a configuration message to a terminal, herein the configuration message is for configuring at least two Sounding Reference Signal, SRS, resource sets for the terminal, and the SRS resource sets are for acquiring Channel State Information, CSI, of an uplink signal in a first uplink transmission mode;
  receiving an SRS based on the configuration message transmitted by the terminal, and determining an uplink transmission parameter of a first uplink signal according to the received SRS;
  transmitting the determined uplink transmission parameter to the terminal and instructing the terminal to transmit the first uplink signal according to the uplink transmission parameter.

In embodiments of the application, for the case when the base station can configure at least two SRS resource sets for the terminal, it is proposed how the base station provides the uplink transmission instruction to the terminal. The base station can determine the uplink transmission parameter according to the SRS determined by the terminal based on the configuration message sent by the base station, that is, determine the uplink transmission parameter according to the SRS determined by the terminal, and can flexibly perform the dynamic indication of the uplink sending beam, so that the terminal transmits the uplink signal according to the uplink transmission parameter to schedule the uplink signal transmission more flexibly.

In one embodiment, if the at least two SRS resource sets include an aperiodic SRS resource set or a semi-persistent SRS resource set, the method further includes:
  sending a trigger signaling to the terminal, herein the trigger signaling is for triggering the terminal to send the SRS based on a configuration message of at least one SRS resource set in the aperiodic SRS resource set and/or semi-persistent SRS resource set.

In embodiments of the application, when the base station configures the aperiodic SRS resource set(s) and/or semi-persistent SRS resource set(s) for the terminal, the terminal is notified of the triggered SRS resource set through trigger signaling, so that the terminal determines the SRS based on the triggered SRS resource set.

In one embodiment, one trigger signaling is for triggering the terminal to send the SRS based on a configuration message of one SRS resource set.

In one embodiment, one SRS resource set includes one SRS resource, and the uplink transmission parameter corresponds to the SRS resource included in an SRS resource set triggered by the trigger signaling.

In embodiments of the application, one SRS resource set may include one SRS resource or multiple SRS resources. Correspondingly, one trigger signaling may trigger one SRS resource set, or may trigger one SRS resource in one SRS resource set, that is, the one SRS resource set is used to configure one SRS resource.

In one embodiment, the method further includes:
  sending a spatial related parameter to the terminal.

The spatial related parameter is used to indicate information for determining an uplink sending beam of the SRS, and the SRS is an SRS corresponding to SRS resources in the SRS resource sets;
  One SRS resource corresponds to one spatial related parameter, or one SRS resource set corresponds to one spatial related parameter.

In one embodiment, different SRS resource sets correspond to different spatial related parameters;
  and/or,
  different SRS resources in an SRS resource set correspond to different spatial related parameters.

In embodiments of the application, the base station may also send the spatial related parameter to the terminal. There may be two indication modes for the spatial related parameter, in one indication mode, the spatial related parameter corresponds to the SRS resource set, and in the other indication mode, the spatial related parameter corresponds to the SRS resource. Thus, the uplink sending beam that can be used by the terminal when performing the uplink transmission is indicated.

In one embodiment, the spatial related parameter includes a sending beam index;
  or, the spatial related parameter includes a spatial reference signal identifier used to indicate a reference signal for determining the uplink sending beam of the SRS;
  or, the spatial related parameter includes a spatial reference signal index used to indicate a reference signal for determining the uplink sending beam of the SRS.

In embodiments of the application, two indication modes of the spatial related parameter are provided, of which one is direct indication and the other is indirect indication. For example, the spatial related parameter includes the sending beam index to directly indicate the uplink sending beam. For another example, the spatial related parameter includes the spatial reference signal identifier or spatial reference signal index to indirectly indicate the uplink sending beam through the reference signal.

In one embodiment, the determining an uplink transmission parameter of a first uplink signal according to the received SRS, includes:
  determining the uplink transmission parameter according to a received SRS that is latest transmitted by the terminal.

In one embodiment, the determining an uplink transmission parameter of a first uplink signal according to the received SRS, includes:
  if the most recently-triggered SRS resource is an aperiodic SRS resource, determining the uplink transmission parameter according to an SRS corresponding to the most recently-triggered SRS resource;
  or, if the most recently-triggered SRS resource set is an aperiodic SRS resource set, determining the uplink transmission parameter according to an SRS corresponding to the most recently-triggered SRS resource set;
  or, if the most recently-triggered SRS resource is a semi-persistent SRS resource, determining the uplink transmission parameter according to an SRS, corresponding to the most recently-triggered SRS resource and transmitted by the terminal most recently;
  or, if the most recently-triggered SRS resource set is a semi-persistent SRS resource set, determining the uplink transmission parameter according to an SRS, corresponding to the most recently-triggered SRS resource set and transmitted by the terminal most recently;
  or, if the trigger signaling includes trigger information for triggering aperiodic SRS resources, determining the uplink transmission parameter according to an SRS corresponding to the most recently-triggered aperiodic SRS resource;
  or, if the trigger signaling includes trigger information for triggering aperiodic SRS resource sets, determining the uplink transmission parameter according to an SRS corresponding to the most recently-triggered aperiodic SRS resource set;
  or, if the trigger signaling includes trigger information for triggering semi-persistent SRS resources, determining the uplink transmission parameter according to an SRS, corresponding to the most recently-triggered semi-persistent SRS resource and transmitted by the terminal most recently;
  or, if the trigger signaling includes trigger information for triggering semi-persistent SRS resource sets, determining the uplink transmission parameter according to an SRS, corresponding to the most recently-triggered semi-persistent SRS resource set and transmitted by the terminal most recently.

In embodiments of the application, a variety of modes in which the base station determines the uplink transmission parameter(s) according to the SRS sent by the terminal are provided. No matter which mode is used, the uplink transmission parameter(s) can be determined, and the application range is wider.

In one embodiment, the uplink transmission parameter includes at least one of:
  Transmitted Precoding Matrix Indicator (TPMI);
  Transmitted Rank Indicator (TRI);
  SRS Resource Indicator (SRI);
  SRS resource set indicator.

In embodiments of the application, the uplink transmission parameter(s) may include one or more of TPMI, TRI, SRI, and SRS resource set indicator, which may be adaptively adjusted according to the transmission type such as codebook or non-codebook.

In one embodiment, the uplink transmission parameter includes TPMI and TRI, and before sending the determined uplink transmission parameter to the terminal, the method further includes:
  determining the number of coded bits of the TPMI and TRI according to the number of antenna ports of a SRS resource for determining the uplink transmission parameter.

In one embodiment, the uplink transmission parameter includes TPMI and TRI, and before sending the determined uplink transmission parameter to the terminal, the method further includes:
  if all SRS resources in the at least two SRS resource sets include the same number of antenna ports, determining the number of coded bits of the TPMI and TRI according to the number of antenna ports.

In one embodiment, the uplink transmission parameter includes TPMI and TRI, and before sending the determined uplink transmission parameter to the terminal, the method further includes:
  if there are SRS resources including different numbers of antenna ports in the at least two SRS resource sets, determining the number of coded bits of the TPMI and TRI according to a maximum value of the numbers of antenna ports included in all SRS resources in the at least two SRS resource sets;
  or
  if there are SRS resources including different numbers of antenna ports in an SRS resource set corresponding to the received SRS transmitted by the terminal, determining the number of coded bits of the TPMI and TRI according to a maximum value of the numbers of antenna ports included in all SRS resources in the SRS resource set corresponding to the received SRS transmitted by the terminal.

In embodiments of the application, for the case when the uplink transmission parameter(s) include the TPMI and TRI, several possible determination modes in which the base station determines the number of coded bits of the TPMI and TRI are proposed.

In one embodiment, the uplink transmission parameter includes SRI, and before sending the determined uplink transmission parameter to the terminal, the method further includes:
  determining the SRI according to the number of SRS resources included in a SRS resource set of the determined uplink transmission parameter.

In one embodiment, the uplink transmission parameter includes SRI, and before sending the determined uplink transmission parameter to the terminal, the method further includes:
  if all SRS resource sets in the at least two SRS resource sets include the same number of SRS resources, determining the number of coded bits of the SRI according to the number of SRS resources.

In one embodiment, the uplink transmission parameter includes SRI, and before sending the determined uplink transmission parameter to the terminal, the method further includes:
  if there are SRS resource sets including different numbers of SRS resources in the at least two SRS resource sets, determining the number of coded bits of the SRI according to a maximum value of the numbers of SRS resources included in all SRS resource sets among the at least two SRS resource sets.

In embodiments of the application, for the case when the uplink transmission parameter(s) include the SRI, several possible determination modes in which the base station determines the number of coded bits of the SRI are proposed.

In one embodiment, the sending the determined uplink transmission parameter to the terminal, includes:
sending first DCI carrying the uplink transmission parameter to the terminal;
or, sending first RRC signaling carrying the uplink transmission parameter to the terminal.

In one embodiment, the method further includes:
sending SRS resource set indicator to the terminal through second DCI or second RRC signaling, herein the SRS resource set indicator indicates an SRS resource set corresponding to the uplink transmission parameter, the second DCI is the same as or different from the first DCI, and the second RRC signaling is the same as or different from the first RRC signaling.

In embodiments of the application, several ways for the base station to indicate the uplink transmission parameter(s) to the terminal are proposed, which may be implemented by way of DCI, RRC signaling, or the combination of them.

In one embodiment, the method further includes: determining the number of coded bits of the SRS resource set indicator according to the number of SRS resource sets, herein the number of SRS resource sets is at least one of:
the number of the at least two SRS resource sets;
the number of SRS resource sets with a specific time-domain behavior type in the at least two SRS resource sets, herein the specific time-domain behavior type is at least one of periodic, aperiodic and semi-persistent;
the number of SRS resource sets corresponding to all SRSs of the configuration message;
the number of SRS resource sets with a specific time-domain behavior type in SRS resource sets corresponding to all SRSs of the configuration message, herein the specific time-domain behavior type is at least one of periodic, aperiodic and semi-persistent;
the number of SRS resource sets corresponding to SRS resources with a specific time-domain behavior type among all SRS resources corresponding to all SRSs of the configuration message, herein the specific time-domain behavior type is at least one of periodic, aperiodic and semi-persistent.

In embodiments of the application, various possible implementations of determining the number of coded bits of the SRS resource set indicator according to the number of SRS resource sets are provided.

In one embodiment, the method further includes:
receiving the first uplink signal from the terminal with first analog beam, herein the first analog beam is the analog beam used to receive the SRS for determining the uplink transmission parameter.

In embodiments of the application, the base station receives the first uplink signal by the analog beam used when receiving the SRS corresponding to the uplink transmission parameter(s), to ensure the quality and robustness of beamforming as much as possible.

In a second aspect, an uplink transmission instruction method applied to a terminal-side device is provided, which includes:

receiving a configuration message from a base station, herein the configuration message is for configuring at least two Sounding Reference Signal, SRS, resource sets for the terminal, and the SRS resource set is used for acquiring Channel State Information, CSI, of an uplink signal in a first uplink transmission mode;
sending an SRS based on the configuration message to the base station;
receiving an uplink transmission parameter determined by the base station according to the SRS; and
sending a first uplink signal to the base station according to the uplink transmission parameter.

In embodiments of the application, for the case when the base station can configure at least two SRS resource sets for the terminal, it is proposed how the base station gives the uplink transmission instruction to the terminal. The terminal determines the SRS based on the configuration message sent by the base station and sends the determined SRS to the base station for the base station to determine the uplink transmission parameter(s), that is, the base station determines the uplink transmission parameter(s) according to the SRS determined by the terminal, thus the dynamic indication of the uplink sending beam can be performed flexibly, so that the terminal transmits the uplink signal according to the uplink transmission parameter(s) to schedule the uplink signal transmission more flexibly.

In one embodiment, the sending an SRS based on the configuration message to the base station, includes:
receiving trigger signaling from the base station, and sending the SRS to the base station according to the configuration message and the trigger signaling, herein the trigger signaling is for triggering the terminal to send the SRS based on a configuration message of at least one SRS resource set in an aperiodic SRS resource set and/or a semi-persistent SRS resource set.

In one embodiment, the trigger signaling is for triggering the terminal to send the SRS based on a configuration message of one SRS resource set, or the trigger signaling is for triggering the terminal to send the SRS based on a configuration message of one SRS resource in one SRS resource set.

In one embodiment, one SRS resource set includes one SRS resource, and the uplink transmission parameter corresponds to the SRS resource included in the SRS resource set triggered by the trigger signaling.

In one embodiment, the method further includes:
receiving a spatial related parameter from the base station, herein the spatial related parameter indicates information for determining an uplink sending beam of the SRS, and the SRS is an SRS corresponding to SRS resources in the SRS resource sets;
One SRS resource corresponds to one spatial related parameter, or one SRS resource set corresponds to one spatial related parameter.

In one embodiment, different SRS resource sets correspond to different spatial related parameters;
and/or,
different SRS resources in an SRS resource set correspond to different spatial related parameters.

In one embodiment, the spatial related parameter includes a sending beam index;
or, the spatial related parameter includes a spatial reference signal identifier used to indicate a reference signal for determining the uplink sending beam of the SRS;
or, the spatial related parameter includes a spatial reference signal index used to indicate a reference signal for determining the uplink sending beam of the SRS.

In one embodiment, the uplink transmission parameter include at least one of:
Transmitted Precoding Matrix Indicator (TPMI);
Transmitted Rank Indicator (TRI);
SRS Resource Indicator (SRI);
SRS resource set indicator.

In one embodiment, the receiving the uplink transmission parameter determined by the base station according to the SRS, includes:
receiving first DCI carrying the uplink transmission parameter from the base station;
or, receiving first RRC signaling carrying the uplink transmission parameter from the base station.

In one embodiment, the receiving the uplink transmission parameter determined by the base station according to the SRS, includes:
receiving second DCI carrying SRS resource set indicator from the base station, or receiving second RRC signaling carrying SRS resource set indicator from the base station; and
determining an SRS resource set, corresponding to the first uplink signal and/or the uplink transmission parameter, according to the SRS resource set indicator;
The SRS resource set indicator indicates an SRS resource set corresponding to the uplink transmission parameter, and the second DCI is the same as or different from the first DCI, and the second RRC signaling is the same as or different from the first RRC signaling.

In one embodiment, after receiving the uplink transmission parameter determined by the base station according to the SRS, the method further includes:
determining an SRS corresponding to the uplink transmission parameter.

In one embodiment, the uplink transmission parameter includes TPMI and TRI, and after receiving the uplink transmission parameter determined by the base station according to the SRS, the method further includes:
determining the number of coded bits of the TPMI and TRI according to the number of antenna ports of a SRS resource for determining the uplink transmission parameter.

In one embodiment, the uplink transmission parameter includes TPMI and TRI, and after receiving the uplink transmission parameter determined by the base station according to the SRS, the method further includes:
if all SRS resources in the at least two SRS resource sets include the same number of antenna ports, determining the number of coded bits of the TPMI and TRI according to the number of antenna ports.

In one embodiment, the uplink transmission parameter includes TPMI and TRI, and after receiving the uplink transmission parameter(s) determined by the base station according to the SRS, the method further includes:
if there are SRS resources including different numbers of antenna ports in the at least two SRS resource sets, determining the number of coded bits of the TPMI and TRI according to a maximum value of the numbers of antenna ports included in all SRS resources in the at least two SRS resource sets;
or
if there are SRS resources including different numbers of antenna ports in an SRS resource set corresponding to the SRS sent by the terminal, determining the number of coded bits of the TPMI and TRI according to a maximum value of the numbers of antenna ports included in all SRS resources in the SRS resource set corresponding to the received SRS sent by the terminal.

In embodiments of the application, for the case when the uplink transmission parameter(s) include the TPMI and TRI, several possible determination modes in which the terminal determines the number of coded bits of the TPMI and TRI are proposed.

In one embodiment, the uplink transmission parameter includes SRI, and after receiving the uplink transmission parameter determined by the base station according to the SRS, the method further includes:
determining the SRI according to the number of SRS resources included in a SRS resource set for determining the uplink transmission parameter.

In one embodiment, the uplink transmission parameter includes SRI, and after receiving the uplink transmission parameter determined by the base station according to the SRS, the method further includes:
if all SRS resource sets in the at least two SRS resource sets include the same number of SRS resources, determining the number of coded bits of the SRI according to the number of SRS resources.

In one embodiment, the uplink transmission parameter includes SRI, and after receiving the uplink transmission parameter determined by the base station according to the SRS, the method further includes:
if there are SRS resource sets including different numbers of SRS resources in the at least two SRS resource sets, determining the number of coded bits of the SRI according to a maximum value of the numbers of SRS resources included in all SRS resource sets among the at least two SRS resource sets.

In embodiments of the application, for the case when the uplink transmission parameter(s) include the SRI, several possible determination modes in which the terminal determines the number of coded bits of the SRI are proposed.

In one embodiment, after receiving the uplink transmission parameter determined by the base station according to the SRS, the method further includes:
determining the number of coded bits of the uplink transmission parameter;
decoding the uplink transmission parameter according to the number of coded bits to obtain TPMI and TRI or obtain TPMI, TRI and SRI.

In one embodiment, the method further includes:
determining precoding of the first uplink signal according to the SRS;
sending the first uplink signal to the base station according to the determined precoding.

In one embodiment, the determining precoding of the first uplink signal according to the SRS, includes:
determining the precoding of the first uplink signal according to the SRS and the uplink transmission parameter.

In one embodiment, the method further includes:
determining a transmitting antenna of the first uplink signal according to the SRS;
sending the first uplink signal to the base station by using the determined transmitting antenna.

In one embodiment, the sending a first uplink signal according to the uplink transmission parameter, includes:
sending the first uplink signal to the base station with first analog beam, herein the first analog beam is the analog beam used to transmit the SRS corresponding to the uplink transmission parameter.

In a third aspect, a base station is provided, which includes:
  a memory configured to store instructions;
  a processor configured to read the instructions in the memory to perform the process of:
    sending a configuration message to a terminal via a transceiver, herein the configuration message is for configuring at least two Sounding Reference Signal, SRS, resource sets for the terminal, and the SRS resource set is for acquiring Channel State Information, CSI, of an uplink signal in a first uplink transmission mode;
    receiving an SRS based on the configuration message sent by the terminal, and determining an uplink transmission parameter of a first uplink signal according to the received SRS;
    sending the determined uplink transmission parameter to the terminal and instructing the terminal to transmit the first uplink signal according to the uplink transmission parameter;
  the transceiver configured to receive and send data under control of the processor.

In one embodiment, if the at least two SRS resource sets include an aperiodic SRS resource set or a semi-persistent SRS resource set, the processor is further configured to:
  send a trigger signaling to the terminal via the transceiver, herein the trigger signaling is for triggering the terminal to send the SRS based on a configuration message of at least one SRS resource set in the aperiodic SRS resource set and/or semi-persistent SRS resource set.

In one embodiment, one trigger signaling is for triggering the terminal to send the SRS based on a configuration message of one SRS resource set.

In one embodiment, one SRS resource set includes one SRS resource, and the uplink transmission parameter corresponds to an SRS resource included in the SRS resource set triggered by the trigger signaling.

In one embodiment, the processor is further configured to:
  send a spatial related parameter to the terminal via the transceiver, herein the spatial related parameter is used to indicate information for determining an uplink sending beam of the SRS, and the SRS is an SRS corresponding to SRS resources in the SRS resource sets;
  One SRS resource corresponds to one spatial related parameter, or one SRS resource set corresponds to one spatial related parameter.

In one embodiment, different SRS resource sets correspond to different spatial related parameters; and/or,
  different SRS resources in an SRS resource set correspond to different spatial related parameters.

In one embodiment, the spatial related parameter includes a sending beam index;
  or, the spatial related parameter includes a spatial reference signal identifier used to indicate a reference signal for determining the uplink sending beam of the SRS;
  or, the spatial related parameter includes a spatial reference signal index used to indicate a reference signal for determining the uplink sending beam of the SRS.

In one embodiment, the processor is configured to:
  determine the uplink transmission parameter according to a received SRS that is latest sent by the terminal.

In one embodiment, the processor is configured to:
  if the most recently-triggered SRS resource is an aperiodic SRS resource, determine the uplink transmission parameter according to an SRS corresponding to the most recently-triggered SRS resource;
  or, if the most recently-triggered SRS resource set is an aperiodic SRS resource set, determine the uplink transmission parameter according to an SRS corresponding to the most recently-triggered SRS resource set;
  or, if the most recently-triggered SRS resource is a semi-persistent SRS resource, determine the uplink transmission parameter according to an SRS, corresponding to the most recently-triggered SRS resource and transmitted by the terminal most recently;
  or, if the most recently-triggered SRS resource set is a semi-persistent SRS resource set, determine the uplink transmission parameter according to an SRS, corresponding to the most recently-triggered SRS resource set and transmitted by the terminal most recently;
  or, if the trigger signaling includes trigger information for triggering aperiodic SRS resources, determine the uplink transmission parameter according to an SRS corresponding to the most recently-triggered aperiodic SRS resource;
  or, if the trigger signaling includes trigger information for triggering aperiodic SRS resource sets, determine the uplink transmission parameter according to an SRS corresponding to the most recently-triggered aperiodic SRS resource set;
  or, if the trigger signaling includes trigger information for triggering semi-persistent SRS resources, determine the uplink transmission parameter according to an SRS, corresponding to the most recently-triggered semi-persistent SRS resource and transmitted by the terminal most recently;
  or, if the trigger signaling includes trigger information for triggering semi-persistent SRS resource sets, determine the uplink transmission parameter according to an SRS, corresponding to the most recently-triggered semi-persistent SRS resource set and transmitted by the terminal most recently.

In one embodiment, the uplink transmission parameter includes at least one of:
  Transmitted Precoding Matrix Indicator (TPMI);
  Transmitted Rank Indicator (TRI);
  SRS Resource Indicator (SRI);
  SRS resource set indicator.

In one embodiment, the processor is further configured to:
  determine the number of coded bits of the TPMI and TRI according to the number of antenna ports of a SRS resource of the determined uplink transmission parameter.

In one embodiment, the processor is further configured to:
  if all SRS resources in the at least two SRS resource sets include the same number of antenna ports, determine the number of coded bits of the TPMI and TRI according to the number of antenna ports.

In one embodiment, the processor is further configured to:
  if there are SRS resources including different numbers of antenna ports in the at least two SRS resource sets, determine the number of coded bits of the TPMI and TRI according to a maximum value of the numbers of antenna ports included in all SRS resources in the at least two SRS resource sets;
  or
  if there are SRS resources including different numbers of antenna ports in an SRS resource set corresponding to the received SRS sent by the terminal, determine the number of coded bits of the TPMI and TRI according to a maximum value of the numbers of antenna ports included in all SRS resources in the SRS resource set corresponding to the received SRS sent by the terminal.

In one embodiment, the processor is further configured to:
determine the SRI according to the number of SRS resources included in a SRS resource set of the determined uplink transmission parameter.

In one embodiment, the processor is further configured to:
if all SRS resource sets in the at least two SRS resource sets include the same number of SRS resources, determine the number of coded bits of the SRI according to the number of SRS resources.

In one embodiment, the processor is further configured to:
if there are SRS resource sets including different numbers of SRS resources in the at least two SRS resource sets, determine the number of coded bits of the SRI according to a maximum value of the numbers of SRS resources included in all SRS resource sets among the at least two SRS resource sets.

In one embodiment, the processor is configured to:
send the first DCI carrying the uplink transmission parameter to the terminal via the transceiver;
or, send the first RRC signaling carrying the uplink transmission parameter to the terminal via the transceiver.

In one embodiment, the processor is configured to:
send SRS resource set indicator to the terminal through second DCI or second RRC signaling, herein the SRS resource set indicator indicates an SRS resource set corresponding to the uplink transmission parameter, the second DCI is the same as or different from the first DCI, and the second RRC signaling is the same as or different from the first RRC signaling.

In one embodiment, the processor is configured to:
determine the number of coded bits of the SRS resource set indicator according to the number of SRS resource sets, herein the number of SRS resource sets is at least one of:
the number of the at least two SRS resource sets;
the number of SRS resource sets with a specific time-domain behavior type in the at least two SRS resource sets, and the specific time-domain behavior type is at least one of periodic, aperiodic and semi-persistent;
the number of SRS resource sets corresponding to all SRSs of the configuration message;
the number of SRS resource sets with a specific time-domain behavior type in SRS resource sets corresponding to all SRSs of the configuration message, and the specific time-domain behavior type is at least one of periodic, aperiodic and semi-persistent;
the number of SRS resource sets corresponding to SRS resources with a specific time-domain behavior type among all SRS resources corresponding to all SRSs of the configuration message, and the specific time-domain behavior type is at least one of periodic, aperiodic and semi-persistent.

In one embodiment, the processor is further configured to:
receive the first uplink signal from the terminal with first analog beam, and the first analog beam is the analog beam used to receive the SRS for determining the uplink transmission parameter.

The embodiments of the application, the reference may be made to the embodiments of the implementations of the first aspect described above, which will not be repeated here.

In a fourth aspect, a base station is provided, which includes:
a first sending device configured to send a configuration message to a terminal, herein the configuration message is for configuring at least two Sounding Reference Signal, SRS, resource sets for the terminal, and the SRS resource sets are for acquiring Channel State Information, CSI, of an uplink signal in a first uplink transmission mode;
a determining device configured to receive an SRS based on the configuration message sent by the terminal, and determine an uplink transmission parameter of a first uplink signal according to the received SRS;
a second sending device configured to send the determined uplink transmission parameter to the terminal and instruct the terminal to transmit the first uplink signal according to the uplink transmission parameter.

In one embodiment, if the at least two SRS resource sets include an aperiodic SRS resource set or a semi-persistent SRS resource set, the first sending device is further configured to:
send a trigger signaling to the terminal, herein the trigger signaling is used to trigger the terminal to send the SRS based on a configuration message of at least one SRS resource set in the aperiodic SRS resource set and/or semi-persistent SRS resource set.

In one embodiment, one trigger signaling is used to trigger the terminal to send the SRS based on a configuration message of one SRS resource set.

In one embodiment, one SRS resource set includes one SRS resource, and the uplink transmission parameter corresponds to an SRS resource included in the SRS resource set triggered by the trigger signaling.

In one embodiment, the first sending device is further configured to:
send a spatial related parameter to the terminal, herein the spatial related parameter is used to indicate information for determining an uplink sending beam of the SRS, and the SRS is an SRS corresponding to the SRS resources in the SRS resource sets;
one SRS resource corresponds to one spatial related parameter, or one SRS resource set corresponds to one spatial related parameter.

In one embodiment, different SRS resource sets correspond to different spatial related parameters;
and/or,
different SRS resources in an SRS resource set correspond to different spatial related parameters.

In one embodiment, the spatial related parameter includes a sending beam index;
or, the spatial related parameter includes a spatial reference signal identifier used to indicate a reference signal for determining the uplink sending beam of the SRS;
or, the spatial related parameter includes a spatial reference signal index used to indicate a reference signal for determining the uplink sending beam sending the SRS.

In one embodiment, the determining device is configured to:
determine the uplink transmission parameter according to a received SRS that is latest sent by the terminal.

In one embodiment, the determining device is configured to:
if the most recently-triggered SRS resource is an aperiodic SRS resource, determine the uplink transmission parameter according to an SRS corresponding to the most recently-triggered SRS resource;
or, if the most recently-triggered SRS resource set is an aperiodic SRS resource set, determine the uplink transmission parameter according to an SRS corresponding to the most recently-triggered SRS resource set;
or, if the most recently-triggered SRS resource is a semi-persistent SRS resource, determine the uplink transmission parameter according to an SRS, corresponding to the most recently-triggered SRS resource and transmitted by the terminal most recently;

or, if the most recently-triggered SRS resource set is a semi-persistent SRS resource set, determine the uplink transmission parameter according to an SRS, corresponding to the most recently-triggered SRS resource set and transmitted by the terminal most recently;

or, if the trigger signaling includes trigger information for triggering aperiodic SRS resources, determine the uplink transmission parameter according to an SRS corresponding to the most recently-triggered aperiodic SRS resource;

or, if the trigger signaling includes trigger information for triggering aperiodic SRS resource sets, determine the uplink transmission parameter according to an SRS corresponding to the most recently-triggered aperiodic SRS resource set;

or, if the trigger signaling includes trigger information for triggering semi-persistent SRS resources, determine the uplink transmission parameter according to an SRS, corresponding to the most recently-triggered semi-persistent SRS resource and transmitted by the terminal most recently;

or, if the trigger signaling includes trigger information for triggering semi-persistent SRS resource sets, determine the uplink transmission parameter according to an SRS, corresponding to the most recently-triggered semi-persistent SRS resource set and transmitted by the terminal most recently.

In one embodiment, the uplink transmission parameter includes at least one of:
Transmitted Precoding Matrix Indicator (TPMI);
Transmitted Rank Indicator (TRI);
SRS Resource Indicator (SRI);
SRS resource set indicator.

In one embodiment, the determining device is further configured to:
determine the number of coded bits of the TPMI and TRI according to the number of antenna ports of the SRS resource of the determined uplink transmission parameter.

In one embodiment, the determining device is further configured to:
if all SRS resources in the at least two SRS resource sets include the same number of antenna ports, determine the number of coded bits of the TPMI and TRI according to the number of antenna ports.

In one embodiment, the determining device is further configured to:
if there are SRS resources including different numbers of antenna ports in the at least two SRS resource sets, determine the number of coded bits of the TPMI and TRI according to a maximum value of the numbers of antenna ports included in all SRS resources in the at least two SRS resource sets;
or
if there are SRS resources including different numbers of antenna ports in an SRS resource set corresponding to the received SRS sent by the terminal, determine the number of coded bits of the TPMI and TRI according to a maximum value of the numbers of antenna ports included in all SRS resources in the SRS resource set corresponding to the received SRS sent by the terminal.

In one embodiment, the determining device is further configured to:
determine the SRI according to the number of SRS resources included in a SRS resource set of the determined uplink transmission parameter.

In one embodiment, the determining device is further configured to:
if all SRS resource sets in the at least two SRS resource sets include the same number of SRS resources, determine the number of coded bits of the SRI according to the number of SRS resources.

In one embodiment, the determining device is further configured to:
if there are SRS resource sets including different numbers of SRS resources in the at least two SRS resource sets, determine the number of coded bits of the SRI according to a maximum value of the numbers of SRS resources included in all SRS resource sets among the at least two SRS resource sets.

In one embodiment, the first sending device is specifically configured to:
send first DCI carrying the uplink transmission parameter to the terminal;
or, send first RRC signaling carrying the uplink transmission parameter to the terminal.

In one embodiment, the first sending device is configured to:
send SRS resource set indicator to the terminal through second DCI or second RRC signaling, herein the SRS resource set indicator is used to indicate an SRS resource set corresponding to the uplink transmission parameter, the second DCI is the same as or different from the first DCI, and the second RRC signaling is the same as or different from the first RRC signaling.

In one embodiment, the determining device is configured to:
determine the number of coded bits of the SRS resource set indicator according to the number of SRS resource sets, herein the number of SRS resource sets is at least one of:
the number of the at least two SRS resource sets;
the number of SRS resource sets with a specific time-domain behavior type in the at least two SRS resource sets, and the specific time-domain behavior type is at least one of periodic, aperiodic and semi-persistent;
the number of SRS resource sets corresponding to all SRSs of the configuration message;
the number of SRS resource sets with a specific time-domain behavior type in SRS resource sets corresponding to all SRSs of the configuration message, and the specific time-domain behavior type is at least one of periodic, aperiodic and semi-persistent;
the number of SRS resource sets corresponding to SRS resources with a specific time-domain behavior type among all SRS resources corresponding to all SRSs of the configuration message, and the specific time-domain behavior type is at least one of periodic, aperiodic and semi-persistent.

In one embodiment, the determining device is further configured to:
receive the first uplink signal from the terminal with first analog beam, and the first analog beam is the analog beam used to receive the SRS for determining the uplink transmission parameter.

The base station provided by the embodiments of the application, the reference may be made to the implementations of the first aspect described above, which will not be repeated here.

In a fifth aspect, a terminal is provided, which includes:
a memory configured to store instructions;
a processor configured to read the instructions in the memory to perform the process of:
receiving a configuration message from a base station via a transceiver, herein the configuration message is used for configuring at least two Sounding Reference Signal, SRS, resource sets for the terminal, and the SRS resource set is used for acquiring Channel State Information, CSI, of an uplink signal in a first uplink transmission mode;
sending an SRS based on the configuration message to the base station;
receiving an uplink transmission parameter determined by the base station according to the SRS; and
sending a first uplink signal to the base station according to the uplink transmission parameter;
the transceiver configured to receive and send data under control of the processor.

In one embodiment, the processor is further configured to:
receive the trigger signaling from the base station and send the SRS to the base station according to the configuration message and the trigger signaling via the transceiver, herein the trigger signaling is used to trigger the terminal to send the SRS based on a configuration message of at least one SRS resource set in an aperiodic SRS resource set and/or a semi-persistent SRS resource set.

In one embodiment, the trigger signaling is used to trigger the terminal to send the SRS based on a configuration message of one SRS resource set, or the trigger signaling is used to trigger one SRS resource in one SRS resource set.

In one embodiment, one SRS resource set includes one SRS resource, and the uplink transmission parameter corresponds to the SRS resource included in the SRS resource set triggered by the trigger signaling.

In one embodiment, the processor is further configured to:
receive a spatial related parameter from the base station via the transceiver, herein the spatial related parameter is used to indicate information for determining an uplink sending beam of the SRS, and the SRS is an SRS corresponding to SRS resources in the SRS resource sets;
one SRS resource corresponds to one spatial related parameter, or one SRS resource set corresponds to one spatial related parameter.

In one embodiment, different SRS resource sets correspond to different spatial related parameters;
and/or,
different SRS resources in an SRS resource set correspond to different spatial related parameters.

In one embodiment, the spatial related parameter includes a sending beam index;
or, the spatial related parameter includes a spatial reference signal identifier used to indicate a reference signal for determining the uplink sending beam of the SRS;
or, the spatial related parameter includes a spatial reference signal index used to indicate a reference signal for determining the uplink sending beam of the SRS.

In one embodiment, the uplink transmission parameter includes at least one of:
Transmitted Precoding Matrix Indicator (TPMI);
Transmitted Rank Indicator (TRI);
SRS Resource Indicator (SRI);
SRS resource set indicator.

In one embodiment, the processor is configured to:
receive the first DCI carrying the uplink transmission parameter from the base station via the transceiver;
or, receive the first RRC signaling carrying the uplink transmission parameter from the base station via the transceiver.

In one embodiment, the processor is further configured to:
receive the second DCI carrying the SRS resource set indicator from the base station or receive the second RRC signaling carrying the SRS resource set indicator from the base station via the transceiver;
determine an SRS resource set, corresponding to the first uplink signal and/or the uplink transmission parameter, according to the SRS resource set indicator;
herein the SRS resource set indicator is used to indicate an SRS resource set corresponding to the uplink transmission parameter, and the second DCI is the same as or different from the first DCI, and the second RRC signaling is the same as or different from the first RRC signaling.

In one embodiment, the processor is further configured to:
determine an SRS corresponding to the uplink transmission parameter.

In one embodiment, the processor is further configured to:
determine the number of coded bits of the TPMI and TRI according to the number of antenna ports of the SRS resource for determining the uplink transmission parameter.

In one embodiment, the processor is further configured to:
if all SRS resources in the at least two SRS resource sets include the same number of antenna ports, determine the number of coded bits of the TPMI and TRI according to the number of antenna ports.

In one embodiment, the processor is further configured to:
if there are SRS resources including different numbers of antenna ports in the at least two SRS resource sets, determine the number of coded bits of the TPMI and TRI according to a maximum value of the numbers of antenna ports included in all SRS resources in the at least two SRS resource sets;
or
if there are SRS resources including different numbers of antenna ports in an SRS resource set corresponding to the SRS sent by the terminal, determine the number of coded bits of the TPMI and TRI according to a maximum value of the numbers of antenna ports included in all SRS resources in the SRS resource set corresponding to the received SRS sent by the terminal.

In one embodiment, the processor is further configured to:
determine the SRI according to the number of SRS resources included in the SRS resource set for determining the uplink transmission parameter.

In one embodiment, the processor is further configured to:
if all SRS resource sets in the at least two SRS resource sets include the same number of SRS resources, determine the number of coded bits of the SRI according to the number of SRS resources.

In one embodiment, the processor is further configured to:
if there are SRS resource sets including different numbers of SRS resources in the at least two SRS resource sets, determine the number of coded bits of the SRI according to a maximum value of the numbers of SRS resources included in all SRS resource sets among the at least two SRS resource sets.

In one embodiment, the processor is further configured to:
determine the number of coded bits of the uplink transmission parameter;
decode the uplink transmission parameter according to the number of coded bits to obtain TPMI and TRI or obtain TPMI, TRI and SRI.

In one embodiment, the processor is further configured to:
determine precoding of the first uplink signal according to the SRS;
send the first uplink signal to the base station according to the determined precoding.

In one embodiment, the processor is specifically configured to:
determine the precoding of the first uplink signal according to the SRS and the uplink transmission parameter.

In one embodiment, the processor is further configured to:
determine a transmitting antenna of the first uplink signal according to the SRS;
send the first uplink signal to the base station by using the determined transmitting antenna.

In one embodiment, the processor is configured to:
send the first uplink signal to the base station with first analog beam, and the first analog beam is the analog beam used to send the SRS corresponding to the uplink transmission parameter.

For the technical effects of the terminal provided by the embodiments of the application, the reference may be made to the technical effects of the implementations of the second aspect described above, which will not be repeated here.

In a sixth aspect, a terminal is provided, which includes:
a first receiving device configured to receive a configuration message from a base station, herein the configuration message is used for configuring at least two Sounding Reference Signal, SRS, resource sets for the terminal, and the SRS resource set is used for acquiring Channel State Information, CSI, of an uplink signal in a first uplink transmission mode;
a first sending device configured to send an SRS based on the configuration message to the base station;
a second receiving device configured to receive an uplink transmission parameter determined by the base station according to the SRS; and
a second sending device configured to send a first uplink signal to the base station according to the uplink transmission parameter.

In one embodiment, the first receiving device is further configured to:
receive trigger signaling from the base station, and send the SRS to the base station according to the configuration message and the trigger signaling, herein the trigger signaling is used to trigger the terminal to send the SRS based on a configuration message of at least one SRS resource set in an aperiodic SRS resource set and/or a semi-persistent SRS resource set configured by the configuration message.

In one embodiment, the trigger signaling is used to trigger one SRS resource set, or the trigger signaling is used to trigger one SRS resource in one SRS resource set.

In one embodiment, one SRS resource set includes one SRS resource, and the uplink transmission parameter corresponds to the SRS resource included in the SRS resource set triggered by the trigger signaling.

In one embodiment, the first receiving device is further configured to:
receive a spatial related parameter from the base station, herein the spatial related parameter is used to indicate information for determining an uplink sending beam of the SRS, and the SRS is an SRS corresponding to the SRS resources in the SRS resource sets;
one SRS resource corresponds to one spatial related parameter, or one SRS resource set corresponds to one spatial related parameter.

In one embodiment, different SRS resource sets correspond to different spatial related parameters;
and/or,
different SRS resources in an SRS resource set correspond to different spatial related parameters.

In one embodiment, the spatial related parameter includes a sending beam index;
or, the spatial related parameter includes a spatial reference signal identifier used to indicate a reference signal for determining the uplink sending beam of the SRS;
or, the spatial related parameter includes a spatial reference signal index used to indicate a reference signal for determining the uplink sending beam of the SRS.

In one embodiment, the uplink transmission parameter includes at least one of:
Transmitted Precoding Matrix Indicator (TPMI);
Transmitted Rank Indicator (TRI);
SRS Resource Indicator (SRI);
SRS resource set indicator.

In one embodiment, the first receiving device is configured to:
receive first DCI carrying the uplink transmission parameter from the base station;
or, receive first RRC signaling carrying the uplink transmission parameter from the base station.

In one embodiment, the first receiving device is further configured to:
receive second DCI carrying SRS resource set indicator from the base station, or receive second RRC signaling carrying SRS resource set indicator from the base station;
determine an SRS resource set, corresponding to the first uplink signal and/or the uplink transmission parameter, according to the SRS resource set indicator;
herein the SRS resource set indicator is used to indicate an SRS resource set corresponding to the uplink transmission parameter, and the second DCI is the same as or different from the first DCI, and the second RRC signaling is the same as or different from the first RRC signaling.

In one embodiment, the second receiving device is further configured to:
determine an SRS corresponding to the uplink transmission parameter.

In one embodiment, the second receiving device is further configured to:
determine the number of coded bits of the TPMI and TRI according to the number of antenna ports of the SRS resource for determining the uplink transmission parameter.

In one embodiment, the second receiving device is further configured to:
if all SRS resources in the at least two SRS resource sets include the same number of antenna ports, determine the number of coded bits of the TPMI and TRI according to the number of antenna ports.

In one embodiment, the second receiving device is further configured to:
if there are SRS resources including different numbers of antenna ports in the at least two SRS resource sets, determine the number of coded bits of the TPMI and TRI according to a maximum value of the numbers of antenna ports included in all SRS resources in the at least two SRS resource sets;
or
if there are SRS resources including different numbers of antenna ports in an SRS resource set corresponding to the SRS sent by the terminal, determine the number of coded bits of the TPMI and TRI according to a maximum value of the numbers of antenna ports included in all SRS resources in the SRS resource set corresponding to the received SRS sent by the terminal.

In one embodiment, the second receiving device is further configured to:
determine the SRI according to the number of SRS resources included in the SRS resource set for determining the uplink transmission parameter.

In one embodiment, the second receiving device is further configured to:
if all SRS resource sets in the at least two SRS resource sets include the same number of SRS resources, determine the number of coded bits of the SRI according to the number of SRS resources.

In one embodiment, the second receiving device is further configured to:
if there are SRS resource sets including different numbers of SRS resources in the at least two SRS resource sets, determine the number of coded bits of the SRI according to a maximum value of the numbers of SRS resources included in all SRS resource sets among the at least two SRS resource sets.

In one embodiment, the second receiving device is further configured to:
determine the number of coded bits of the uplink transmission parameter;
decode the uplink transmission parameter according to the number of coded bits to obtain TPMI and TRI or obtain TPMI, TRI and SRI.

In one embodiment, the second receiving device is further configured to:
determine precoding of the first uplink signal according to the SRS;
send the first uplink signal to the base station according to the determined precoding.

In one embodiment, the second receiving device is specifically configured to:
determine the precoding of the first uplink signal according to the SRS and the uplink transmission parameter.

In one embodiment, the second receiving device is further configured to:
determine a transmitting antenna of the first uplink signal according to the SRS;
send the first uplink signal to the base station by using the determined transmitting antenna.

In one embodiment, the second sending device is specifically configured to:
send the first uplink signal to the base station with first analog beam, and the first analog beam is the analog beam used to send the SRS corresponding to the uplink transmission parameter.

For the technical effects of the terminal provided by the embodiments of the application, the reference may be made to the technical effects of the implementations of the second aspect described above, which will not be repeated here.

In a seventh aspect, a computer storage medium with a computer program stored thereon is provided, where the computer program, when executed by a processor, implements the method as described in any one of the first or second aspect.

In the embodiments of the application, for the case when the base station can configure at least two SRS resource sets for the terminal, it is proposed how the base station gives the uplink transmission instruction to the terminal. The base station can determine the uplink transmission parameter(s) according to the SRS, determined by the terminal based on the configuration message sent by the base station, that is, determine the uplink transmission parameter(s) according to the SRS determined by the terminal, and can flexibly perform the dynamic indication of the uplink sending beam, so that the terminal transmits the uplink signal according to the uplink transmission parameter(s) to schedule the uplink signal transmission more flexibly.

DETAILED DESCRIPTION OF THE EMBODIMENTS

Figure 1:
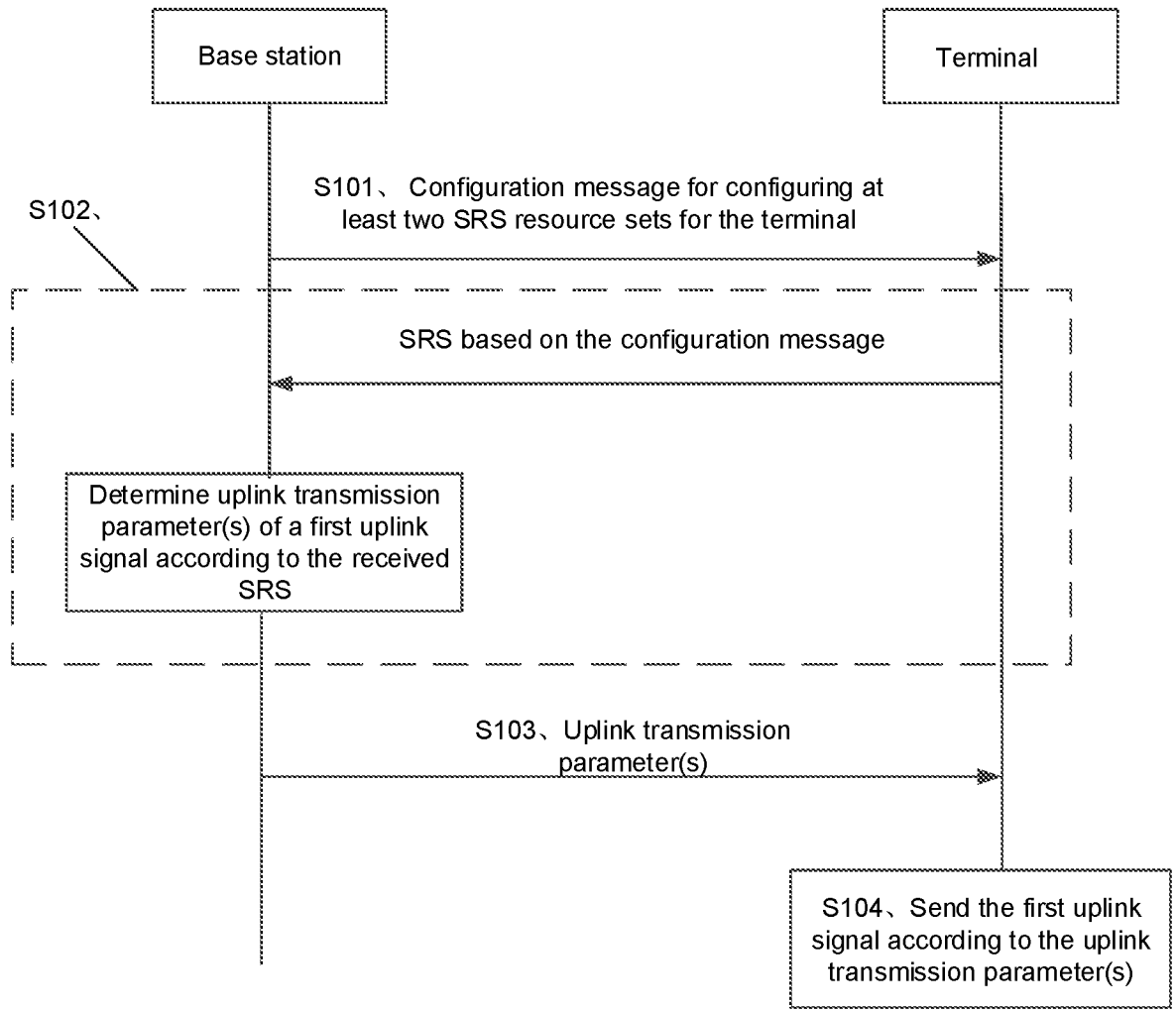
FIG. 1 is a schematic flowchart of an uplink transmission instruction method provided by an embodiment of the invention.

The accompanying drawings describe the embodiments of the application. Obviously the described embodiments are a part of the embodiments of the invention but not all the embodiments.

It should be understood that the embodiments of the application can be applied to various communication systems, for example, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system, Universal Mobile Telecommunication System (UMTS), New Radio (NR) and the like.

It should be further understood that the User Equipment (UE) in the embodiments of the invention includes but not limited to a Mobile Station (MS), a mobile terminal, a mobile telephone, a handset, a portable equipment or the like. The user equipment may communicate with one or more core networks via the Radio Access Network (RAN), for example, the user equipment may be a mobile telephone (or called "cellular" telephone), a computer with the wireless communication function, or the like. The user equipment may also be a portable, pocket, handheld, computer built-in or in vehicle mobile device.

In the embodiments of the invention, the base station (e.g., access point) may refer to the device in the access network communicating with the wireless terminal via one or more sectors over the air interface. The base station may be used to perform the inter-conversion between the received air frame and the IP packet, and used as the router between the wireless terminal and the rest of the access network, the rest of the access network may include Internet Protocol (IP) networks. The base station may further coordinate the attribute management of the air interface. For example, the base station may be the Base Transceiver Station (BTS) in the GSM or CDMA, or may be the NodeB in the TD-SCDMA or WCDMA, or may be the evolutional Node B (eNodeB or eNB or e-NodeB) in the LTE, or may be the gNB in the 5G NR, which is not limited in the invention.

The background art of the embodiments of the invention will be introduced below.

A wireless transmitter (such as base station, terminal) with a plurality of antennas can form a beam pointing to a specific direction by beamforming, to send wireless signals. The width and direction of the beam can be flexibly adjusted by applying appropriate weights on respective antenna devices. The beamforming can be performed in the digital domain or analog domain. When each antenna device has a separate baseband device, each antenna device can independently control the amplitude and phase of the signal transmitted on the antenna device, to realize the digital beamforming. The digital beamforming can be narrowband beamforming, that is, at a given moment, the transmitter can use different digital beamformings on different frequency bands, and it is not necessary to use the same digital beamforming in the entire system bandwidth. If a plurality of antenna devices share the same digital baseband component and each antenna device has an independent phase shifter, these antenna devices can form analog beams. In this case, for the signal sent on an antenna device, the sending phase only can be independently adjusted, but the amplitude cannot be independently adjusted. Therefore, the analog beams are usually broadband (applied to the entire system bandwidth) and can only be multiplexed in the time domain. Since the use of digital devices is reduced, a purely analog beamforming transmitter has the lower hardware cost and power consumption compared to a transmitter that uses the digital beamforming. In an actual system, the beamforming includes digital beamforming, analog beamforming, and analog-digital hybrid beamforming.

At present, the base station configures an SRS resource set for the terminal, so that the terminal acquires the Channel State Information (CSI) of a certain uplink transmission mode, e.g., the uplink transmission mode based on codebook. If the base station configures an uplink sending beam for each SRS resource or an SRS resource set in the semi-static configuration way, the Radio Resource Control (RRC) reconfiguration needs to be performed when the uplink sending beam of one SRS resource needs to be changed, that is, it cannot be adjusted flexibly. However, the delay of the RRC reconfiguration is as high as 100-200 ms, which may affect the performance of analog beamforming in some application scenarios.

Furthermore, the analog beamforming is mainly used for high frequency bands, such as frequency band from 6 GHz to 52.6 GHz. Compared with the frequency band below 6 GHz, the propagation loss of high frequency bands (for example, caused by path loss, scattering, reflection, etc.) is more serious. Due to the mobility and rotation of the terminal, the beam blocking between the transmitter and the receiver is more frequent. Therefore, it is quite necessary to use the flexible beam adjustment to adapt to the rapidly-changed propagation channel to ensure the quality and robustness of beamforming.

At present, in the wireless air interface technology (NR for short) system of the 5th Generation mobile communication technology (5G) network, for the codebook-based uplink transmission, one SRS resource set for CSI acquisition contains at most 2 SRS resources, and the SRS Resource Indicator (SRI) in the uplink scheduling grant is used to indicate one SRS resource from the two SRS resources configured in the SRS resource set. In this way, the codebook-based uplink transmission supports the beam selection between at most 2 uplink sending beams through SRI. For the non-codebook uplink transmission, one SRS resource set for CSI acquisition contains at most 4 SRS resources, and the SRI in the uplink grant is used to indicate one or more SRS resources from the 4 SRS resources configured in the SRS resource set. In this way, the non-codebook-based uplink transmission supports the beam selection among at most 4 uplink sending beams through SRI. It can be seen that the current selection range of uplink sending beams is relatively limited, which cannot adapt to the rapidly-changed propagation channel well, and it is difficult to ensure the quality of beamforming.

In view of this, in the embodiments of the invention, for the case when the base station can configure at least two SRS resource sets for the terminal, it is proposed how the base station gives the uplink transmission instruction to the terminal. The base station can determine the uplink transmission parameter(s) according to the SRS determined by the terminal based on the configuration message sent by the base station, that is, determine the uplink transmission parameter(s) according to the SRS determined by the terminal, and can flexibly perform the dynamic indication of the uplink sending beam, so that the terminal transmits the uplink signal according to the uplink transmission parameter(s) to schedule the uplink signal transmission more flexibly.

The embodiments of the invention will be introduced below with reference to the drawings of the specification.

Referring to FIG. 1, an embodiment of the invention provides an uplink transmission instruction method. The flow of the method is described as follows. Since the uplink transmission instruction method involves the interaction process between a base station and a terminal, the processes performed by the base station and the terminal will be described together in the following flow description.

S101: sending a configuration message to the terminal, herein the configuration message is for configuring at least two SRS resource sets for the terminal, and the SRS resource set is for acquiring the Channel State Information (CSI) of an uplink signal in a first uplink transmission mode.

In embodiments of the application, the base station may configure at least two SRS resource sets for the terminal so that the terminal obtains the CSI of the uplink signal, for example, of which the uplink transmission mode is the codebook-based transmission mode or the uplink transmission mode is the non-codebook-based transmission mode or the uplink transmission mode is another type of transmission mode (Taking the current protocol of the 3GPP NR system as an example, the configuration method of the SRS resource for acquiring the CSI of the uplink signal in the codebook-based uplink transmission mode is: the usage in the high-level parameter SRS-ResourceSet corresponding to the SRS resource set is configured as 'codebook', then this SRS resource set is the SRS resource set corresponding to the CSI acquisition of the uplink signal of which the uplink transmission mode is the codebook-based transmission mode. The configuration method of the SRS resource for acquiring the CSI of the uplink signal of which the uplink transmission mode is the non-codebook transmission mode is: the usage in the high-level parameter SRS-ResourceSet corresponding to the SRS resource set is configured as 'nonCodebook', then this SRS resource set is the SRS resource set corresponding to the CSI acquisition of the uplink signal of which the uplink transmission mode is the non-codebook transmission mode). Here, each SRS resource set may include one SRS resource, or may include multiple SRS resources. If each SRS resource set includes multiple SRS resources, the number of SRS resources included in respective SRS resource sets may be the same or different. Each SRS resource may include one antenna port or multiple antenna ports, and the number of antenna ports included in respective SRS resources in respective SRS resource sets may be the same or different.

The terminal receives the configuration message sent by the base station, and determines the SRS based on the configuration message based on the configuration message. In embodiments of the application, the SRS resource sets configured by the base station for the terminal may be one or more of periodic SRS resource sets, aperiodic SRS resource sets and semi-persistent SRS resource sets. It should be noted that an SRS resource set is an aperiodic SRS resource set, which herein means that the time-domain type of the SRS resource set is aperiodic and/or the SRS resource set includes SRS resources of which the time-domain type is aperiodic. Similarly, an SRS resource set is a periodic SRS resource set, which means that the time-domain type of the SRS resource set is periodic and/or the SRS resource set includes SRS resources of which the time-domain type is periodic. An SRS resource set is a semi-persistent SRS resource set, which means that the time-domain type of the SRS resource set is semi-persistent and/or the SRS resource set includes SRS resources of which the time-domain type is semi-persistent.

Figure 2:
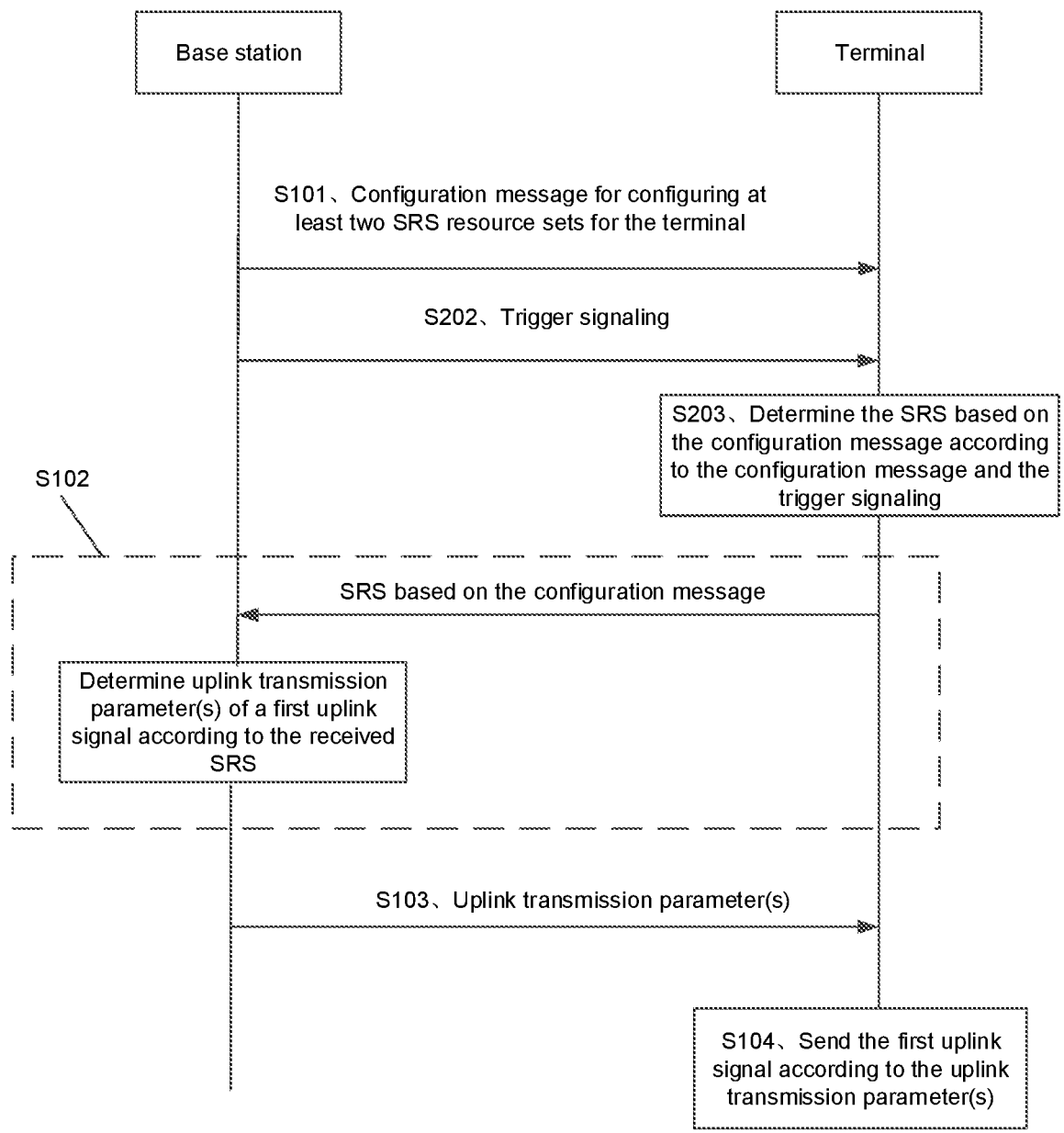
FIG. 2 is a schematic flowchart of an uplink transmission instruction method provided by an embodiment of the invention.

Referring to FIG. 2, if the SRS resource sets configured by the base station for the terminal are aperiodic SRS resource sets and/or semi-persistent SRS resource sets, then in S202, the base station further sends a trigger signaling to the terminal, the trigger signaling is used to trigger the terminal to send the SRS based on the configuration message of at least one SRS resource set in the configured aperiodic SRS resource sets and/or semi-persistent SRS resource sets. Thus, in S203, the terminal can determine the SRS based on the configuration message according to the configuration message and the trigger signaling. Specifically, the terminal sends the SRS corresponding to the periodic SRS resource set according to the configuration message. Or, the terminal sends the SRS corresponding to the aperiodic SRS resource set and/or the semi-persistent SRS resource set according to the configuration message and the trigger signaling.

In possible embodiments, one trigger signaling can be used to trigger one SRS resource set, or can be used to trigger one SRS resource in the SRS resource set. If one SRS resource set includes one SRS resource, the trigger signaling can trigger the SRS resource included in the SRS resource set to trigger one SRS resource.

In the prior art, the base station only allows one SRS resource set for CSI acquisition to be configured for one uplink transmission mode, to perform the semi-static beam indication. The current SRS triggering mechanism only supports three different SRS activation states (the base station can only activate one of three SRS resource sets through Downlink Control Information (DCI)). Considering that the system may require a large number of SRS configurations for different purposes, this mechanism is very inflexible. For example, considering a hybrid beamforming system, it needs at least two SRS resource sets for the codebook-based uplink transmission: the first SRS resource set is used for analog beamforming, and the second SRS resource set is used for CSI acquisition. The base station firstly needs to trigger the first SRS resource set to perform the Uplink (UL) beam scanning to obtain the optimal UL sending beam. Then the base station configures a high-level parameter "SpatialRelationInfo" for the second SRS resource set through the RRC configuration based on the result of the previous beam scanning. Then the base station triggers the second SRS resource set for CSI acquisition. In this way, the base station needs to trigger the first SRS resource set aperiodicly to search for a new uplink sending beam, and performs the RRC reconfiguration to reconfigure the high-level parameter "SpatialRelationInfo" for the second SRS resource set if a new beam is found. The repetition of this process increases the frequency of RRC reconfiguration, increasing the system delay and limiting the flexibility of beam adjustment.

In embodiments of the application, the base station configures at least two SRS resource sets for the terminal, one SRS resource can be triggered, or one SRS resource set can be triggered, that is, multiple SRS resources in one SRS resource set are triggered, schedule the SRS resources more flexibly and improving the scheduling flexibility.

In embodiments of the application, the base station may further send a spatial related parameter to the terminal, the spatial related parameter is used to indicate the information used by the terminal to determine an uplink sending beam sending the SRS, so that the terminal sends the first uplink signal according to the determined uplink sending beam. If the spatial related parameter is configured for each SRS resource set, all SRS resources in the SRS resource set obtain the uplink sending beam based on this spatial related parameter. In possible embodiments, one SRS resource may correspond to one spatial related parameter, or one SRS resource set may correspond to one spatial related parameter. Different SRS resource sets correspond to different spatial related parameters, and different SRS resources in one SRS resource set correspond to different spatial related parameters. Alternatively, different SRS resources in one SRS resource set correspond to different spatial related parameters.

The spatial related parameter can be achieved by way of direct indication or indirect indication.

Direct indication: the spatial related parameter includes a sending beam index which directly indicates the uplink sending beam.

Indirect indication: the spatial related parameter includes a spatial reference signal identifier which is used to indicate a reference signal used by the terminal to determine the uplink sending beam sending the SRS; or, the spatial related parameter includes a spatial reference signal index which is used to indicate a reference signal used by the terminal to determine the uplink sending beam sending the SRS. For example, in the NR system, the analog beam for sending the SRS can be indicated through the high-level parameter "SpatialRelatedInfo" in the SRS resource configuration (the "SpatialRelationInfo" of the SRS resources in the 3GPP NR system corresponds to the parameter SRS-SpatialRelation- Info in the high-level signaling SRS-Resource parameters in TS38.331. For the convenience of expression, the "SpatialRelationInfo" is used herein to represent the spatial related parameter information for indicating a signal or resource, including but not limited to: SRS-SpatialRelationInfo, PUCCH-SpatialRelationInfo, QCL-Info and other parameters with similar functions in the 3GPP NR protocol), the source signal is indicated in the "SpatialRelatedInfo", and the terminal needs to determine the sending beam of the first signal according to the spatial domain transmission filter of the source signal indicated by the "SpatialRelatedInfo". For example, when the source signal is a Channel State Information Reference Signal (CSI-RS) or Synchronization Signal/Physical broadcast channel Block (SSB), the terminal uses the spatial domain filter that receives the source signal as the spatial domain transmission filter that sends the SRS corresponding to the SRS resource; if the source signal is an SRS, the terminal uses the spatial domain filter that receives the source signal as the spatial domain transmission filter that sends the SRS corresponding to the SRS resource.

S102: receiving an SRS based on the configuration message sent by the terminal, and determining an uplink transmission parameter of a first uplink signal according to the received SRS.

The base station configures at least two SRS resource sets for the terminal by sending the configuration message to the terminal. After receiving the configuration message, the terminal can determine the SRS based on the configuration message according to the configuration message. The terminal sends the determined SRS to the base station, and the base station determines the uplink transmission parameter(s) of the first uplink signal according to the SRS, instructing the terminal to transmit the first uplink signal according to the uplink transmission parameter(s), the uplink transmission parameter(s) include one or more of Transmitted Precoding Matrix Indicator (TPMI), Transmitted Rank Indicator (TRI), SRS Resource Indicator (SRI), and SRS resource set indicator.

In embodiments of the application, the modes in which the base station determines the uplink transmission parameter(s) based on the SRS sent by the terminal may include several modes as follows.

First Type:
If the base station configures periodic SRS resource sets for the terminal, the terminal may determine multiple SRSs based on the configuration message, and the base station can determine the uplink transmission parameter(s) according to the SRS sent by the terminal most recently among the received multiple SRSs.

Second Type:
If the base station configures aperiodic SRS resource sets or semi-persistent SRS resource sets for the terminal, the following cases are included.

(1) If the SRS resource triggered by the base station most recently is an aperiodic SRS resource, the base station determines the uplink transmission parameter(s) according to the SRS corresponding to the most recently-triggered SRS resource among the received SRSs.

(2) If the SRS resource set triggered by the base station most recently is an aperiodic SRS resource set, the base station determines the uplink transmission parameter(s) according to the SRS corresponding to the most recently-triggered SRS resource set among the received SRSs.

(3) If the SRS resource triggered by the base station most recently is a semi-persistent SRS resource, the base station determines the uplink transmission parameter(s) according to the SRS, corresponding to the most recently-triggered SRS resource and transmitted by the terminal most recently, among the received SRSs.

(4) If the SRS resource set triggered by the base station most recently is a semi-persistent SRS resource set, the base station determines the uplink transmission parameter(s) according to the SRS, corresponding to the most recently-triggered SRS resource set and transmitted by the terminal most recently, among the received SRSs.

(5) If the trigger signaling includes the trigger information for triggering aperiodic SRS resources, the base station determines the uplink transmission parameter(s) according to the SRS corresponding to the most recently-triggered aperiodic SRS resource among the received SRSs.

(6) If the trigger signaling includes the trigger information for triggering aperiodic SRS resource sets, the base station determines the uplink transmission parameter(s) according to the SRS corresponding to the most recently-triggered aperiodic SRS resource set among the received SRSs.

(7) If the trigger signaling includes the trigger information for triggering semi-persistent SRS resources, the base station determines the uplink transmission parameter(s) according to the SRS, corresponding to the most recently-triggered semi-persistent SRS resource and transmitted by the terminal most recently, among the received SRSs.

(8) If the trigger signaling includes the trigger information for triggering semi-persistent SRS resource sets, the base station determines the uplink transmission parameter(s) according to the SRS, corresponding to the most recently-triggered semi-persistent SRS resource set and transmitted by the terminal most recently, among the received SRSs.

S103: sending the determined uplink transmission parameter(s) to the terminal to instruct the terminal to transmit the first uplink signal according to the uplink transmission parameter(s).

S104: the terminal sends the first uplink signal according to the uplink transmission parameter(s).

After determining the uplink transmission parameter(s), the base station sends the uplink transmission parameter(s) to the terminal. In possible embodiments, the base station may send the uplink transmission parameter(s) to the terminal by sending the DCI or RRC signaling. For example, the base station sends the first DCI carrying the uplink transmission parameter(s) to the terminal, or, the base station sends the first RRC signaling carrying the uplink transmission parameter(s) to the terminal.

In possible embodiments, the base station may also send the SRS resource set indicator to the terminal to indicate the SRS resource set corresponding to the uplink transmission parameter(s). The base station may send the SRS resource set indicator to the terminal through the second DCI or second RRC signaling, the second DCI is the same as or different from the first DCI, and the second RRC signaling is the same as or different from the first RRC signaling.

The SRS resource set indicator may be used to indicate one SRS resource set from all the SRS resource sets, configured by the base station for the terminal and used for CSI acquisition in the uplink transmission mode. The SRS resource set indicator may also be used to indicate one SRS resource set among the SRS resource sets with a specific time-domain behavior type, configured by the base station for the terminal and used for CSI acquisition in the uplink transmission mode, the specific time-domain behavior type may be at least one of periodic, aperiodic, semi-persistent, types agreed between the base station and the terminal.

If the base station sends the SRS resource set indicator to the terminal, the base station determines the uplink transmission parameter(s), such as TPMI and TRI, according to the most recently sent SRS in the SRSs corresponding to the SRS resource sets indicated by the SRS resource set indicator sent by the terminal most recently.

Figure 3:
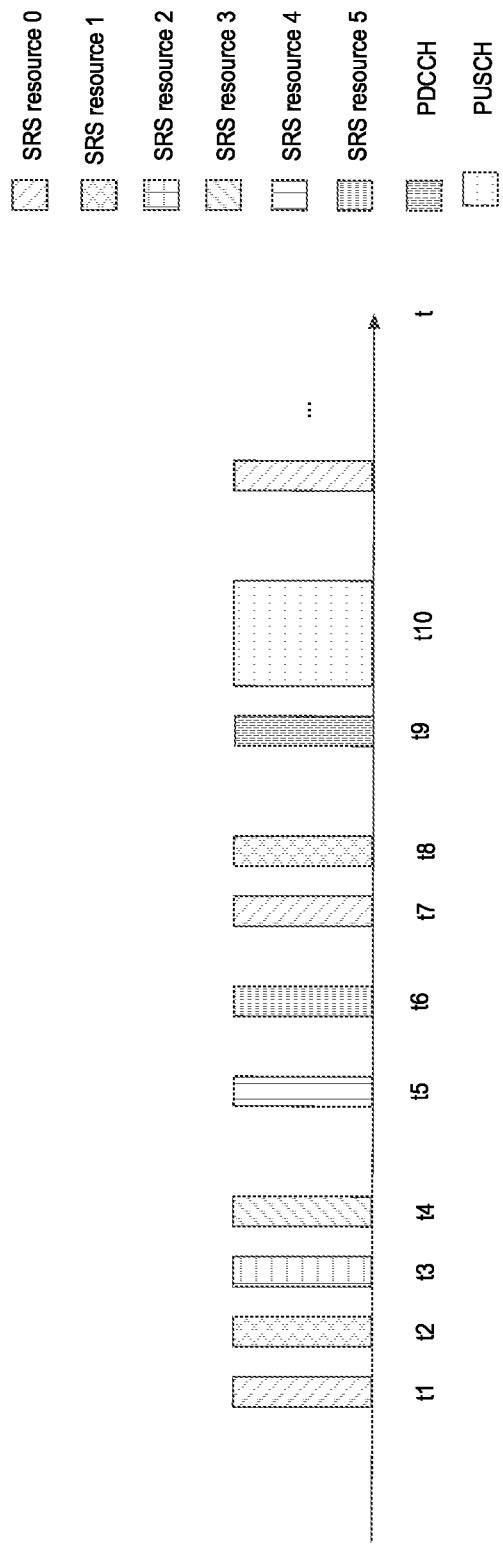
FIG. 3 is a schematic diagram where a base station configures an SRS resource set for a terminal during the codebook-based uplink transmission of PUSCH provided by an embodiment of the invention.

For ease of understanding, referring to FIG. 3, it is assumed that the Physical Uplink Shared Channel (PUSCH) is the codebook-based uplink transmission, and the base station configures 3 SRS resource sets for the codebook-based uplink transmission. Each SRS resource set includes 2 SRS resources, the SRS resource set 1 is a periodic SRS resource set, and the SRS resource set 2 and SRS resource set 3 are aperiodic SRS resource sets. The SRS resource set 1 includes SRS resource 0 and SRS resource 1, the SRS resource set 2 includes SRS resource 3 and SRS resource 4, and the SRS resource set 3 includes SRS resource 5 and SRS resource 6. The times t1, . . . , t10 in FIG. 3 represent the start times of data transmissions. It is assumed that the PUSCH sent at the time t10 is scheduled by the UL grant DCI (for example, DCI format 0_1) in a Physical Downlink Control Channel (PDCCH) sent at the time t9. It is assumed that the SRS resource set indicator included in the second DCI indicates the SRS resource set 1. Since the SRS corresponding to the SRS resource set 1 sent by the terminal most recently before the base station sends the second DCI is the SRS corresponding to the SRS resource 1 sent at the time t8, the base station determines the TPMI and TRI according to the SRS sent by the terminal at the time t8.

In possible embodiments, the base station may also send the SRS resource indicator (SRI) to the terminal to indicate the SRS resources corresponding to the uplink transmission parameter(s). The base station may send the SRI to the terminal through the third DCI or third RRC signaling, the third DCI is the same as or different from the first DCI, and the third RRC signaling is the same as or different from the first RRC signaling.

The SRI can be used to indicate one SRS resource from the SRS resource set corresponding to the TPMI and TRI. The base station may determine the uplink transmission parameter(s) from the SRS, corresponding to the SRS resource indicated by the SRI and sent by the terminal most recently, among the received SRSs. The SRI may be used to indicate one SRS resource set among the SRS resource sets with a specific time-domain behavior type, configured by the base station for the terminal and used for CSI acquisition in the uplink transmission mode.

For ease of understanding, still taking FIG. 3 as an example, it is assumed that the SRS resource set corresponding to the TPMI and TRI is the SRS resource set 1, and the SRI indicates the first SRS resource. The SRS corresponding to the first SRS resource in the SRS resource set 1 and sent by the terminal most recently is the SRS at the time t7, so the base station determines the TPMI and TRI according to the SRS sent by the terminal at the time t7.

The base station determines the TPMI and TRI according to the SRS, sent by the terminal most recently and used for CSI acquisition in the uplink transmission mode. Still taking FIG. 3 as an example, the SRS sent by the terminal most recently before the base station sends the first DCI is the SRS at the time t8, and the base station determines the TPMI and TRI according to the SRS sent by the terminal at the time t8.

If the specific time-domain behavior type is aperiodic, the aperiodic SRS sent by the terminal most recently before the base station sends the first DCI is the SRS at the time t6, and the base station determines the TPMI and TRI according to the SRS sent by the terminal at the time t6.

However, the sending beam of the current PUSCH is the sending beam of the most recent SRS transmission using the SRS resource indicated by the SRI in the same scheduling grant, adding the unnecessary restriction to the system. For example, the base station schedules the first SRS in time slot n and schedules the second SRS in time slot n+k, and the PUSCH is sent in time slot n+k+L, k>0 and L>0. The current NR system stipulates that the PUSCH must use the same sending beam as the most recent SRS transmission of the SRS resource indicated by the SRI, that is, once a new SRS using a new beam is triggered, the PUSCH must wait to be scheduled until the process of performing the CSI acquisition for the SRS using the new beam ends, limiting the scheduling process. In embodiments of the application, the PUSCH is allowed to use the sending beam when sending the earlier SRS, so that the PUSCH can still use the beam of the previous SRS for data transmission when the base station switches the SRS beam (without completing the latest CSI acquisition).

In embodiments of the application, if the SRS resource triggered by the base station includes only one antenna port, there is no TPMI or TRI indication. If the base station sends the SRS resource set indicator to the terminal, the base station can determine the uplink transmission parameter SRI according to the SRS sent by the terminal, to indicate the SRS resources in the SRS resource set used by the terminal to determine the precoding of the first uplink signal.

In embodiments of the application, before sending the uplink transmission parameter(s) to the terminal, the base station can determine the number of coded bits of the uplink transmission parameter(s), etc., so that the uplink transmission parameter(s) are encoded according to the number of coded bits to obtain the coding information, and the coding information is sent to the terminal.

Specifically, according to different uplink transmission parameter(s), the number of coded bits of the uplink transmission parameter(s) determined by the base station also varies, mainly including two cases as follows.

In the first case: the uplink transmission parameter(s) include the TPMI and TRI, and the coding mode and the number of bits of the TPMI and TRI are determined according to the configuration of SRS resources in the SRS resource set, so the base station can firstly determine the SRS resources for the uplink transmission parameter(s) and then determine the number of coded bits of the TPMI and TRI according to the determined SRS resources, including the following ways.

(1) If all SRS resources in the at least two SRS resource sets configured by the base station for the terminal include the same number of antenna ports, the base station determines the number of coded bits of the TPMI and TRI according to the number of antenna ports.

(2) If there are SRS resources including different numbers of antenna ports in the at least two SRS resource sets configured by the base station for the terminal, the base station determines the number of coded bits of the TPMI and TRI according to the maximum value of the numbers of antenna ports included in all SRS resources in the at least two SRS resource sets.

(3) If there are SRS resources including different numbers of antenna ports in the SRS resource set corresponding to the SRS sent by the terminal and received by the base station, the base station determines the number of coded bits of the TPMI and TRI according to the maximum value of the numbers of antenna ports included in all SRS resources in the SRS resource set corresponding to the received SRS sent by the terminal.

(4) The base station can determine the number of coded bits of the TPMI and TRI according to the agreed SRS resources in the SRS resource set agreed with the terminal.

(5) If the base station sends the SRS resource set indicator to the terminal, the base station determines the number of coded bits of the TPMI and TRI according to the most recently sent SRS in the SRSs corresponding to the SRS resource sets indicated by the SRS resource set indicator sent by the terminal most recently.

In the second case: the uplink transmission parameter(s) include the SRI, and the number of coded bits of the SRI is determined according to the number of SRS resources in the SRS resource set, so the base station can firstly determine the number of SRS resources in the SRS resource set for the uplink transmission parameter(s) and then determine the number of coded bits of the SRI according to the determined number of SRS resources, including the following ways.

(1) The base station determines the SRI according to the number of SRS resources included in the SRS resource set of the determined uplink transmission parameter(s).

(2) If all SRS resource sets in the at least two SRS resource sets configured by the base station for the terminal include the same number of SRS resources, the base station determines the number of coded bits of the SRI according to the number of SRS resources.

(3) If there are SRS resource sets including different numbers of SRS resources in the at least two SRS resource sets configured by the base station for the terminal, the base station determines the number of coded bits of the SRI according to the maximum value of the numbers of SRS resources included in all SRS resource sets among the at least two SRS resource sets.

In the possible way, when the base station determines the number of coded bits of the SRI according to the number of SRS resource sets, the number of SRS resource sets may be the number of at least two SRS resource sets, or may be the number of SRS resource sets with the specific time-domain behavior type among the at least two SRS resource sets, or may be the number of SRS resource sets corresponding to all the SRSs of the configuration message sent by the terminal, or may be the number of SRS resource sets with the specific time-domain behavior type among the SRS resource sets corresponding to all the SRSs of the configuration message sent by the terminal, or may be the number of SRS resource sets corresponding to the SRS resources with the specific time-domain behavior type among all SRS resources corresponding to all the SRSs of the configuration message sent by the terminal.

The base station sends the uplink transmission parameter(s) to the terminal, and the terminal transmits the first uplink signal according to the uplink transmission parameter(s). If the terminal receives the first DCI or first RRC signaling from the base station, the terminal can determine the SRS corresponding to the uplink transmission parameter(s) according to the received first DCI or first RRC signaling, and thus determine the information indicated by the uplink transmission parameter(s), e.g., the TPMI and TRI, or the SRI, the precoding of the first uplink signal, the transmission antenna of the first uplink signal, etc., to perform the transmission of the first uplink signal.

Specifically, after receiving the uplink transmission parameter(s), the terminal determines the number of coded bits of the uplink transmission parameter(s), and then decodes the uplink transmission parameter(s) through the number of coded bits to obtain the TPMI and TRI. Alternatively, the terminal decodes the uplink transmission parameter(s) through the number of coded bits to obtain the TPMI, TRI and SRI. The terminal may also determine the precoding or sending antenna of the first uplink signal according to the SRS, or the terminal may determine the precoding of the first uplink signal according to the SRS and uplink transmission parameter(s), and then send the first uplink signal to the base station according to the determined precoding and/or sending antenna.

Specifically, according to different uplink transmission parameter(s), the information indicated by the uplink transmission parameter(s) determined by the terminal also varies, which will be respectively introduced below.

In the first case: the uplink transmission parameter(s) include the TPMI and TRI.

(1) The terminal determines the information indicated by the TPMI and TRI based on the agreed SRS resources in the SRS resource set agreed with the base station. The terminal determines the coding mode and the number of bits of the TPMI and TRI according to the configuration of the SRS resources in the SRS resource set. For example, if the SRS resources in all SRS resource sets include the same number of antenna ports, the coding mode and the number of bits of the TPMI and TRI are determined according to the number of antenna ports; if there are SRS resources including different numbers of antenna ports in the at least two SRS resource sets configured by the base station for the terminal, the number of coded bits of the TPMI and TRI is determined according to the maximum value of the numbers of antenna ports included in all SRS resources in the at least two SRS resource sets; if there are SRS resources including different numbers of antenna ports in the SRS resource set corresponding to the SRS sent by the terminal, the number of coded bits of the TPMI and TRI is determined according to the maximum value of the numbers of antenna ports included in all SRS resources in the SRS resource set corresponding to the sent SRS.

(2) If the TPMI and TRI correspond to the SRS, used for CSI acquisition in the uplink transmission mode and sent by the terminal most recently before the base station sends the first DCI or the first RRC signaling, the terminal determines the number of bits of the TPMI and TRI, the number of bits of the first DCI or first RRC signaling, and the coding information of the TPMI and TRI according to the number of antenna ports included in the SRS. The terminal receives the first DCI or first RRC signaling according to the determined number of bits of the first DCI or first RRC signaling, and obtains the information indicated by the TPMI and TRI.

(3) If the TPMI and TRI correspond to the latest SRS transmission of the SRS resource with the specific time-domain behavior type used for CSI acquisition in the uplink transmission mode and triggered by the base station most recently before the base station sends the first DCI or first RRC signaling, the terminal determines the number of bits of the TPMI and TRI, the assumed number of bits of the first DCI or first RRC signaling, and the coding information of the TPMI and TRI according to the number of antenna ports included in the SRS. The terminal receives the first DCI or first RRC signaling according to the determined number of bits of the first DCI or first RRC signaling, and obtains the information indicated by the TPMI and TRI. The specific time-domain behavior type may be aperiodic SRS resources or semi-persistent SRS resources, may be indicated by the base station, or may be a time-domain behavior type agreed between the base station and the terminal, etc.

In the second case: the uplink transmission parameter(s) include the SRI.

(1) The terminal determines the information indicated by the SRI based on the agreed SRS resources in the SRS resource set agreed with the base station.

(2) The terminal determines the coding mode and the number of bits of the SRI according to the configuration of the SRS resource set. For example, all SRS resource sets include the same number of SRS resources, and the coding mode and the number of bits of the SRI are determined according to this number. If there are SRS resource sets including different numbers of SRS resources in the at least two SRS resource sets configured by the base station for the terminal, the number of coded bits of the SRI is determined according to the maximum value of the numbers of SRS resources included in all SRS resource sets among the at least two SRS resource sets.

(3) The SRI corresponds to the SRS resource set used for CSI acquisition in the uplink transmission mode and sent by the terminal most recently before the base station sends the first DCI or the first RRC signaling. The terminal determines the number of bits of the SRI, the assumed number of bits of the second DCI or second RRC signaling, and the coding information of the SRI according to the number of SRS resources included in the SRS resource set. The terminal receives the second DCI or second RRC signaling according to the determined number of bits of the second DCI or second RRC signaling, and obtains the information indicated by the SRI.

(4) If the SRI corresponds to the SRS resource set with the specific time-domain behavior type used for CSI acquisition in the uplink transmission mode and triggered by the base station most recently before the base station sends the first DCI or first RRC signaling, the terminal determines the number of bits of the SRI, the assumed number of bits of the second DCI or second RRC signaling, and the coding information of the SRI according to the number of SRS resources included in the SRS resource set. The terminal receives the second DCI or second RRC signaling according to the determined number of bits of the second DCI or second RRC signaling, and obtains the information indicated by the SRI.

In the third case: the uplink transmission parameter(s) include the SRS resource set indicator used to indicate the SRS resource set corresponding to the SRI.

If the SRI corresponds to the SRS resource set before the base station sends the first DCI or first RRC signaling, the terminal determines the number of bits of the SRI, the assumed number of bits of the second DCI or second RRC signaling, and the coding information of the SRI according to the number of SRS resources included in the SRS resource set. The terminal receives the second DCI or second RRC signaling according to the determined number of bits of the second DCI or second RRC signaling, and obtains the information indicated by the SRI.

If there is no SRI indication in the second DCI or second RRC signaling, the terminal determines that the number of transmission streams of the first uplink signal is 1 and the number of antenna ports is 1.

After determining the information indicated by the uplink transmission parameter(s), the terminal sends the first uplink signal according to the uplink transmission parameter(s). The terminal sends the first uplink signal to the base station by the first analog beamforming, the first analog beamforming is the same as the analog beamforming used when sending the SRS corresponding to the uplink transmission parameter(s). Correspondingly, the base station receives the first uplink signal from the terminal by the first analog beamforming, the first analog beamforming is the same as the analog beamforming used when receiving the SRS for determining the uplink transmission parameter(s). For example, the base station receives the first uplink signal by the same analog beamforming as that when receiving the SRS corresponding to the TPMI and TRI. The base station receives the first uplink signal by the same analog beamforming as that when receiving the SRS corresponding to the SRI.

For the terminal, in possible embodiments, the terminal sends the first uplink signal by the sending antenna and beamforming used when the terminal sends the SRS used for CSI acquisition in the uplink transmission mode most recently before the base station sends the uplink transmission parameter(s).

Alternatively, if the second DCI or second RRC signaling includes the SRS resource set indicator which indicates the SRS resource set corresponding to the SRI, the terminal sends the first uplink signal by the sending antenna and beamforming used when sending the SRS corresponding to the SRS resource in the SRS resource set most recently.

Alternatively, the terminal determines the precoding and the number of transmission streams of the first uplink signal transmission according to the TPMI, the TRI, and the SRS corresponding to the TPMI and TRI, and sends the first uplink signal, the number of transmission streams of the first uplink signal is equal to the number of data streams indicated by the TPMI and TRI.

Alternatively, the analog beamforming used by the terminal to send the first uplink signal is the analog beamforming when sending the SRS corresponding to the TPMI and TRI.

Alternatively, the terminal determines the precoding and the number of transmission streams of the first uplink signal transmission according to the SRI and the SRS corresponding to the SRI, and sends the first uplink signal, the number of transmission streams of the first uplink signal is equal to the number of data streams indicated by the SRI.

Alternatively, the precoding when the terminal sends the first uplink signal is the precoding when sending the SRS corresponding to the SRI.

In summary, in the embodiments of the application, for the case when the base station can configure at least two SRS resource sets for the terminal, it is proposed how the base station performs the uplink transmission instruction to the terminal. The base station can determine the uplink transmission parameter(s) according to the SRS, determined by the terminal based on the configuration message sent by the base station, that is, determine the uplink transmission parameter(s) according to the SRS determined by the terminal, and can flexibly perform the dynamic indication of the uplink sending beam, so that the terminal transmits the uplink signal according to the uplink transmission parameter(s) to schedule the uplink signal transmission more flexibly.

The devices provided by embodiments of the invention will be introduced below with reference to the drawings of the specification.

Figure 4:
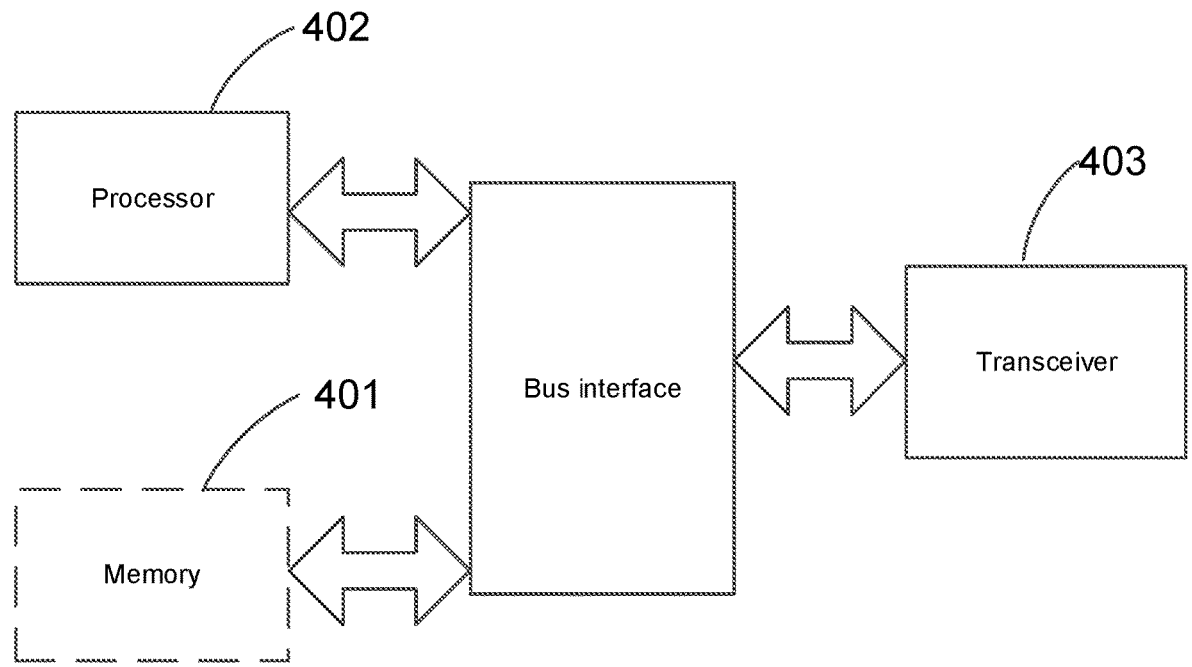
FIG. 4 is a structural schematic diagram of a base station provided by an embodiment of the invention.

Referring to FIG. 4, based on the same inventive concept, an embodiment of the invention provides a base station, which includes a memory 401, a processor 402 and a transceiver 403, the memory 401 and the transceiver 403 may be connected to the processor 402 through a bus interface (taking this as an example in FIG. 4), or may be connected to the processor 402 through special connection lines.

Here, the memory 401 may be configured to store programs. The transceiver is configured to receive and send data under the control of the processor. The processor 402 may be configured to read the programs in the memory 401 to perform the process of:

sending a configuration message to a terminal via the transceiver 403, the configuration message is used for configuring at least two SRS resource sets for the terminal, and the SRS resource sets are used for acquiring the CSI of an uplink signal in a first uplink transmission mode;

receiving an SRS based on the configuration message sent by the terminal, and determining uplink transmission parameter(s) of a first uplink signal according to the received SRS;

sending the determined uplink transmission parameter(s) to the terminal to instruct the terminal to transmit the first uplink signal according to the uplink transmission parameter(s).

In one embodiment, if the at least two SRS resource sets include aperiodic SRS resource sets or semi-persistent SRS resource sets, the processor 402 is further configured to:

send a trigger signaling to the terminal via the transceiver 403, the trigger signaling is used to trigger the terminal to send the SRS based on a configuration message of at least one SRS resource set in the aperiodic SRS resource sets and/or semi-persistent SRS resource sets configured by the configuration message.

In one embodiment, one trigger signaling is used to trigger one SRS resource set.

In one embodiment, one SRS resource set includes one SRS resource, and the uplink transmission parameter(s) correspond to the SRS resource included in an SRS resource set triggered by the trigger signaling.

In one embodiment, the processor 402 is further configured to:

send a spatial related parameter to the terminal via the transceiver 403, the spatial related parameter is used to indicate the information used by the terminal to determine an uplink sending beam sending the SRS, and the SRS is an SRS corresponding to the SRS resources in the SRS resource sets;

one SRS resource corresponds to one spatial related parameter, or one SRS resource set corresponds to one spatial related parameter.

In one embodiment, different SRS resource sets correspond to different spatial related parameters;

and/or, different SRS resources in one SRS resource set correspond to different spatial related parameters.

In one embodiment, the spatial related parameter includes a sending beam index;

or, the spatial related parameter includes a spatial reference signal identifier which is used to indicate a reference signal used by the terminal to determine the uplink sending beam sending the SRS;

or, the spatial related parameter includes a spatial reference signal index which is used to indicate a reference signal used by the terminal to determine the uplink sending beam sending the SRS.

In one embodiment, the processor 402 is configured to:

determine the uplink transmission parameter(s) according to the received SRS that is latest sent by the terminal.

In one embodiment, the processor 402 is configured to:

if the most recently-triggered SRS resource is an aperiodic SRS resource, determine the uplink transmission parameter(s) according to an SRS corresponding to the most recently-triggered SRS resource among the received SRSs;

or, if the most recently-triggered SRS resource set is an aperiodic SRS resource set, determine the uplink transmission parameter(s) according to an SRS corresponding to the most recently-triggered SRS resource set among the received SRSs;

or, if the most recently-triggered SRS resource is a semi-persistent SRS resource, determine the uplink transmission parameter(s) according to an SRS, corresponding to the most recently-triggered SRS resource and transmitted by the terminal most recently, among the received SRSs;

or, if the most recently-triggered SRS resource set is a semi-persistent SRS resource set, determine the uplink transmission parameter(s) according to an SRS, corresponding to the most recently-triggered SRS resource set and transmitted by the terminal most recently, among the received SRSs;

or, if the trigger signaling includes the trigger information for triggering aperiodic SRS resources, determine the uplink transmission parameter(s) according to an SRS corresponding to the most recently-triggered aperiodic SRS resource among the received SRSs;

or, if the trigger signaling includes the trigger information for triggering aperiodic SRS resource sets, determine the uplink transmission parameter(s) according to an SRS corresponding to the most recently-triggered aperiodic SRS resource set among the received SRSs;

or, if the trigger signaling includes the trigger information for triggering semi-persistent SRS resources, determine the uplink transmission parameter(s) according to an SRS, corresponding to the most recently-triggered semi-persistent SRS resource and transmitted by the terminal most recently, among the received SRSs;

or, if the trigger signaling includes the trigger information for triggering semi-persistent SRS resource sets, determine the uplink transmission parameter(s) according to an SRS, corresponding to the most recently-triggered semi-persistent SRS resource set and transmitted by the terminal most recently, among the received SRSs.

In one embodiment, the uplink transmission parameter(s) include at least one of:

Transmitted Precoding Matrix Indicator (TPMI);
Transmitted Rank Indicator (TRI);
SRS Resource Indicator (SRI);
SRS resource set indicator.

In one embodiment, the processor 402 is further configured to:

determine the number of coded bits of the TPMI and TRI according to the number of antenna ports included in the SRS resource of the determined uplink transmission parameter(s).

In one embodiment, the processor 402 is further configured to:

if all SRS resources in the at least two SRS resource sets include the same number of antenna ports, determine the number of coded bits of the TPMI and TRI according to the number of antenna ports.

In one embodiment, the processor 402 is further configured to:

if there are SRS resources including different numbers of antenna ports in the at least two SRS resource sets, determine the number of coded bits of the TPMI and TRI according to the maximum value of the numbers of antenna ports included in all SRS resources in the at least two SRS resource sets;

or if there are SRS resources including different numbers of antenna ports in an SRS resource set corresponding to the received SRS sent by the terminal, determine the number of coded bits of the TPMI and TRI according to the maximum value of the numbers of antenna ports included in all SRS resources in the SRS resource set corresponding to the received SRS sent by the terminal.

In one embodiment, the processor 402 is further configured to:

determine the SRI according to the number of SRS resources included in the SRS resource set of the determined uplink transmission parameter(s).

In one embodiment, the processor 402 is further configured to:

if all SRS resource sets in the at least two SRS resource sets include the same number of SRS resources, determine the number of coded bits of the SRI according to the number of SRS resources.

In one embodiment, the processor 402 is further configured to:

if there are SRS resource sets including different numbers of SRS resources in the at least two SRS resource sets, determine the number of coded bits of the SRI according to the maximum value of the numbers of SRS resources included in all SRS resource sets among the at least two SRS resource sets.

In one embodiment, the processor 402 is configured to: send the first DCI carrying the uplink transmission parameter(s) to the terminal via the transceiver 403;

or, send the first RRC signaling carrying the uplink transmission parameter(s) to the terminal via the transceiver 403.

In one embodiment, the processor 402 is configured to: send the SRS resource set indicator to the terminal through the second DCI or second RRC signaling, and the SRS resource set indicator is used to indicate an SRS resource set corresponding to the uplink transmission parameter(s), the second DCI is the same as or different from the first DCI, and the second RRC signaling is the same as or different from the first RRC signaling.

In one embodiment, the processor 402 is configured to: determine the number of coded bits of the SRS resource set indicator according to the number of SRS resource sets, the number of SRS resource sets is at least one of:

the number of the at least two SRS resource sets;

the number of SRS resource sets with a specific time-domain behavior type in the at least two SRS resource sets, and the specific time-domain behavior type is at least one of periodic, aperiodic and semi-persistent;

the number of SRS resource sets corresponding to all SRSs of the configuration message sent by the terminal;

the number of SRS resource sets with a specific time-domain behavior type in SRS resource sets corresponding to all SRSs of the configuration message sent by the terminal, and the specific time-domain behavior type is at least one of periodic, aperiodic and semi-persistent;

the number of SRS resource sets corresponding to SRS resources with a specific time-domain behavior type among all SRS resources corresponding to all SRSs of the configuration message sent by the terminal, and the specific time-domain behavior type is at least one of periodic, aperiodic and semi-persistent.

In one embodiment, the processor 402 is further configured to:

receive the first uplink signal from the terminal by the first analog beamforming, and the first analog beamforming is the same as the analog beamforming used when receiving the SRS for determining the uplink transmission parameter(s).

Here, in FIG. 4, the bus architecture may include any numbers of interconnected buses and bridges, and specifically link various circuits of one or more processors represented by the processor 402 and the memory represented by the memory 401. The bus architecture may further link various other circuits such as peripheral device, voltage regulator and power management circuit, which are all well known in the art and thus will not be further described again herein. The bus interface provides an interface. The transceiver 403 may be a plurality of elements, i.e., include a transmitter and a receiver, and provide the devices for communicating with various other devices over the transmission media. The processor 402 is responsible for managing the bus architecture and general processing, and the memory 401 may store the data used by the processor 402 when performing the operations.

In one embodiment, the memory 401 may include a Read Only Memory (ROM), a Random Access Memory (RAM), and a magnetic disk memory. The memory 401 is used to store the data required by the processor 402 when running, that is, store the instructions that can be executed by at least one processor 402. The at least one processor 402 performs the uplink transmission instruction method provided by the embodiment shown in FIG. 1 by executing the instructions stored in the memory 401. Here, the number of memories 401 is one or more. Here, the memory 401 is shown together in FIG. 4, but it should be known that the memory 401 is not a mandatory functional device, so it is shown by broken lines in FIG. 4.

Figure 5:
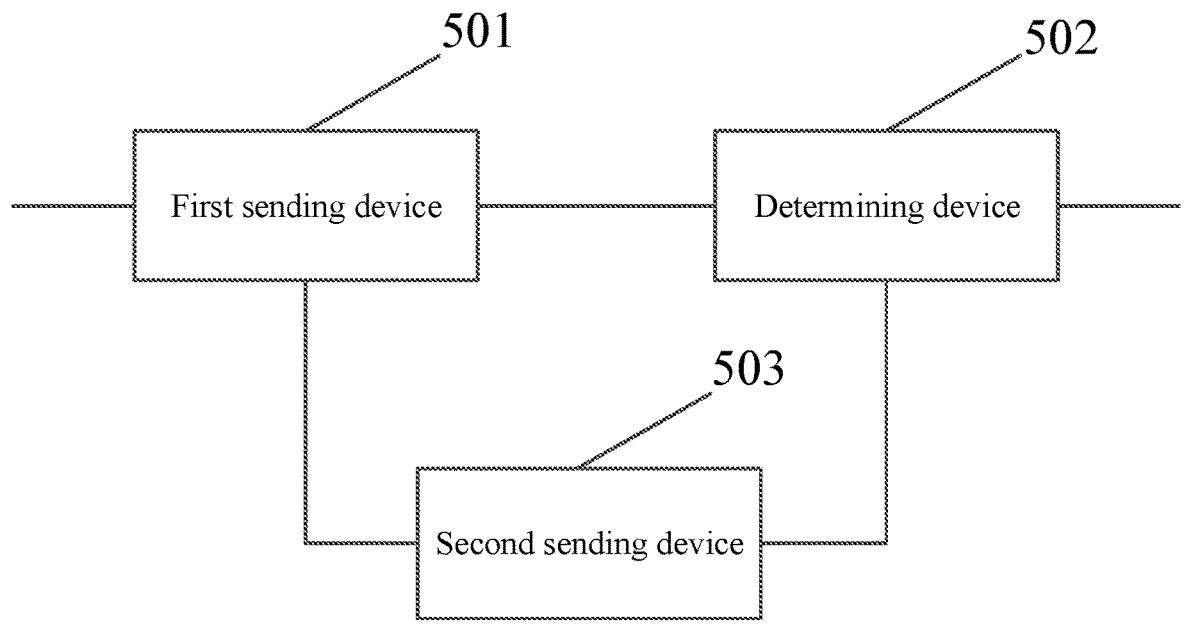
FIG. 5 is a structural schematic diagram of a base station provided by an embodiment of the invention.

Referring to FIG. 5, based on the same inventive concept, an embodiment of the application provides a base station, which includes a first sending device 501, a determining device 502 and a second sending device 503. Here, the first sending device 501 is configured to send a configuration message to a terminal, the configuration message is used for configuring at least two SRS resource sets for the terminal, and the SRS resource sets are used for acquiring the CSI of an uplink signal in a first uplink transmission mode; The determining device 502 is configured to receive an SRS based on the configuration message sent by the terminal, and determine uplink transmission parameter(s) of a first uplink signal according to the received SRS. The second sending device 503 is configured to send the determined uplink transmission parameter(s) to the terminal to instruct the terminal to transmit the first uplink signal according to the uplink transmission parameter(s).

In one embodiment, if the at least two SRS resource sets includes aperiodic SRS resource sets or semi-persistent SRS resource sets, the first sending device 501 is further configured to:

send a trigger signaling to the terminal, the trigger signaling is used to trigger the terminal to send the SRS based on a configuration message of at least one SRS resource set in the aperiodic SRS resource sets and/or semi-persistent SRS resource sets configured by the configuration message.

In one embodiment, one trigger signaling is used to trigger one SRS resource set.

In one embodiment, one SRS resource set contains one SRS resource, and the uplink transmission parameter(s)

correspond to the SRS resource included in an SRS resource set triggered by the trigger signaling.

In one embodiment, the first sending device 501 is further configured to:
send a spatial related parameter to the terminal, the spatial related parameter is used to indicate the information used by the terminal to determine an uplink sending beam sending the SRS, and the SRS is an SRS corresponding to the SRS resource in the SRS resource set;
one SRS resource corresponds to one spatial related parameter, or one SRS resource set corresponds to one spatial related parameter.

In one embodiment, different SRS resource sets correspond to different spatial related parameters;
and/or,
different SRS resources in one SRS resource set correspond to different spatial related parameters.

In one embodiment, the spatial related parameter includes a sending beam index;
or, the spatial related parameter includes a spatial reference signal identifier which is used to indicate a reference signal used by the terminal to determine the uplink sending beam sending the SRS;
or, the spatial related parameter includes a spatial reference signal index which is used to indicate a reference signal used by the terminal to determine the uplink sending beam sending the SRS.

In one embodiment, the determining device 502 is configured to:
determine the uplink transmission parameter(s) according to the received SRS that is latest sent by the terminal.

In one embodiment, the determining device 502 is configured to:
if the most recently-triggered SRS resource is an aperiodic SRS resource, determine the uplink transmission parameter(s) according to an SRS corresponding to the most recently-triggered SRS resource among the received SRSs;
or, if the most recently-triggered SRS resource set is an aperiodic SRS resource set, determine the uplink transmission parameter(s) according to an SRS corresponding to the most recently-triggered SRS resource set among the received SRSs;
or, if the most recently-triggered SRS resource is a semi-persistent SRS resource, determine the uplink transmission parameter(s) according to an SRS, corresponding to the most recently-triggered SRS resource and transmitted by the terminal most recently, among the received SRSs;
or, if the most recently-triggered SRS resource set is a semi-persistent SRS resource set, determine the uplink transmission parameter(s) according to an SRS, corresponding to the most recently-triggered SRS resource set and transmitted by the terminal most recently, among the received SRSs;
or, if the trigger signaling includes the trigger information for triggering aperiodic SRS resources, determine the uplink transmission parameter(s) according to an SRS corresponding to the most recently-triggered aperiodic SRS resource among the received SRSs;
or, if the trigger signaling includes the trigger information for triggering aperiodic SRS resource sets, determine the uplink transmission parameter(s) according to an SRS corresponding to the most recently-triggered aperiodic SRS resource set among the received SRSs;
or, if the trigger signaling includes the trigger information for triggering semi-persistent SRS resources, determine the uplink transmission parameter(s) according to an SRS, corresponding to the most recently-triggered semi-persistent SRS resource and transmitted by the terminal most recently, among the received SRSs;
or, if the trigger signaling includes the trigger information for triggering semi-persistent SRS resource sets, determine the uplink transmission parameter(s) according to an SRS, corresponding to the most recently-triggered semi-persistent SRS resource set and transmitted by the terminal most recently, among the received SRSs.

In one embodiment, the uplink transmission parameter(s) include at least one of:
Transmitted Precoding Matrix Indicator (TPMI);
Transmitted Rank Indicator (TRI);
SRS Resource Indicator (SRI);
SRS resource set indicator.

In one embodiment, the determining device 502 is further configured to:
determine the number of coded bits of the TPMI and TRI according to the number of antenna ports included in the SRS resource of the determined uplink transmission parameter(s).

In one embodiment, the determining device 502 is further configured to:
if all SRS resources in the at least two SRS resource sets include the same number of antenna ports, determine the number of coded bits of the TPMI and TRI according to the number of antenna ports.

In one embodiment, the determining device 502 is further configured to:
if there are SRS resources containing different numbers of antenna ports in the at least two SRS resource sets, determine the number of coded bits of the TPMI and TRI according to the maximum value of the numbers of antenna ports contained in all SRS resources in the at least two SRS resource sets;
or
if there are SRS resources containing different numbers of antenna ports in an SRS resource set corresponding to the received SRS sent by the terminal, determine the number of coded bits of the TPMI and TRI according to the maximum value of the numbers of antenna ports contained in all SRS resources in the SRS resource set corresponding to the received SRS sent by the terminal.

In one embodiment, the determining device 502 is further configured to:
determine the SRI according to the number of SRS resources contained in the SRS resource set of the determined uplink transmission parameter(s).

In one embodiment, the determining device 502 is further configured to:
if all SRS resource sets in the at least two SRS resource sets contain the same number of SRS resources, determine the number of coded bits of the SRI according to the number of SRS resources.

In one embodiment, the determining device 502 is further configured to:
if there are SRS resource sets containing different numbers of SRS resources in the at least two SRS resource sets, determine the number of coded bits of the SRI according to the maximum value of the numbers of SRS resources contained in all SRS resource sets among the at least two SRS resource sets.

In one embodiment, the first sending device 501 is specifically configured to:
send the first DCI carrying the uplink transmission parameter(s) to the terminal;

or, send the first RRC signaling carrying the uplink transmission parameter(s) to the terminal.

In one embodiment, the first sending device 501 is configured to:

send the SRS resource set indicator to the terminal through the second DCI or second RRC signaling, and the SRS resource set indicator is used to indicate an SRS resource set corresponding to the uplink transmission parameter(s), the second DCI is the same as or different from the first DCI, and the second RRC signaling is the same as or different from the first RRC signaling.

In one embodiment, the determining device 502 is configured to:

determine the number of coded bits of the SRS resource set indicator according to the number of SRS resource sets, and the number of SRS resource sets is at least one of:

the number of the at least two SRS resource sets;

the number of SRS resource sets with a specific time-domain behavior type in the at least two SRS resource sets, and the specific time-domain behavior type is at least one of periodic, aperiodic and semi-persistent;

the number of SRS resource sets corresponding to all SRSs of the configuration message sent by the terminal;

the number of SRS resource sets with a specific time-domain behavior type in SRS resource sets corresponding to all SRSs of the configuration message sent by the terminal, and the specific time-domain behavior type is at least one of periodic, aperiodic and semi-persistent;

the number of SRS resource sets corresponding to SRS resources with a specific time-domain behavior type among all SRS resources corresponding to all SRSs of the configuration message sent by the terminal, and the specific time-domain behavior type is at least one of periodic, aperiodic and semi-persistent.

In one embodiment, the determining device 502 is further configured to:

receive the first uplink signal from the terminal by the first analog beamforming, and the first analog beamforming is the same as the analog beamforming used when receiving the SRS for determining the uplink transmission parameter(s).

Here, the physical devices corresponding to the first sending device 501, the determining device 502 and the second sending device 503 may all be the aforementioned processor 402 or transceiver 403. The base station can be used to perform the uplink transmission instruction method provided in the embodiments shown in FIG. 1. Therefore, for the functions that can be implemented by the functional devices in the device, the reference may be made to the corresponding description in the embodiments shown in FIG. 1, which will not be repeated.

Figure 6:
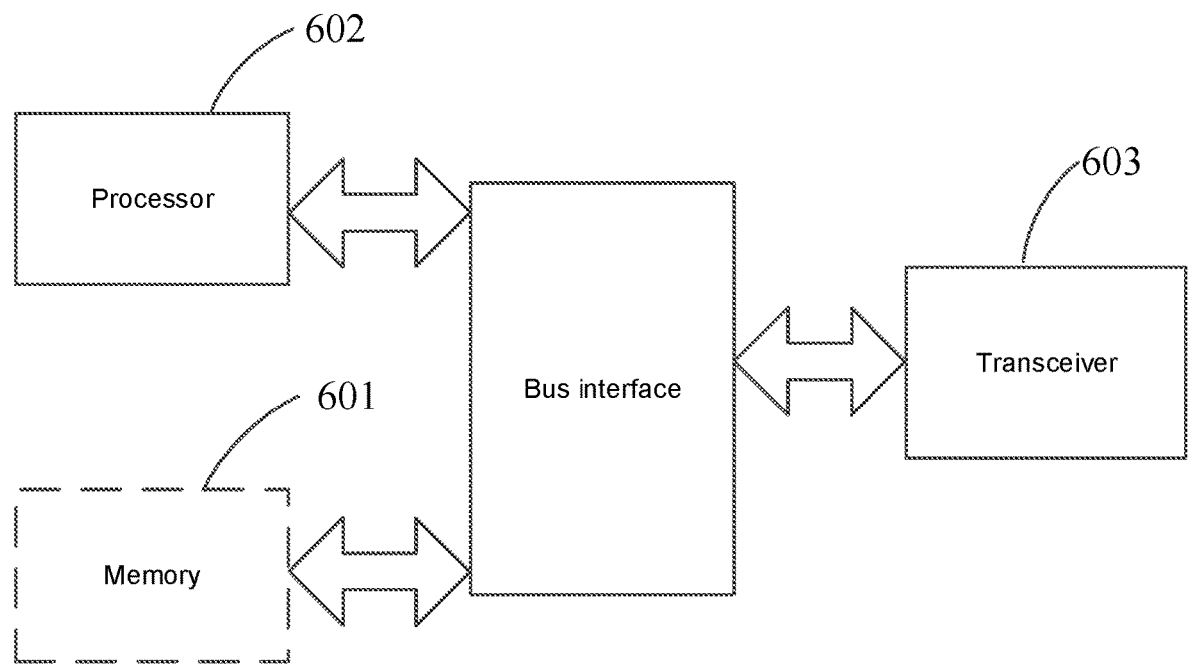
FIG. 6 is a structural schematic diagram of a terminal provided by an embodiment of the invention.

Referring to FIG. 6, based on the same inventive concept, an embodiment of the application provides a terminal, which includes a memory 601, a processor 602 and a transceiver 603, the memory 601 and the transceiver 603 may be connected to the processor 602 through a bus interface (taking this as an example in FIG. 6), or may be connected to the processor 602 through special connection lines.

Here, the memory 601 may be configured to store programs. The transceiver is configured to receive and send data under the control of the processor. The processor 602 may be configured to read the programs in the memory 601 to perform the process of:

receiving a configuration message from a base station via the transceiver 603, and the configuration message is used for configuring at least two SRS resource sets for the terminal, and the SRS resource set is used for acquiring the CSI of an uplink signal in a first uplink transmission mode;

sending an SRS based on the configuration message to the base station;

receiving uplink transmission parameter(s) determined by the base station according to the SRS; and sending a first uplink signal to the base station according to the uplink transmission parameter(s).

The transceiver 603 is configured to receive and send data under the control of the processor 602.

In one embodiment, the processor 602 is further configured to:

receive the trigger signaling from the base station and send the SRS to the base station according to the configuration message and the trigger signaling via the transceiver 603, the trigger signaling is used to trigger the terminal to send the SRS based on a configuration message of at least one SRS resource set in aperiodic SRS resource sets and/or semi-persistent SRS resource sets configured by the configuration message.

In one embodiment, the trigger signaling is used to trigger one SRS resource set, or the trigger signaling is used to trigger one SRS resource in one SRS resource set.

In one embodiment, one SRS resource set contains one SRS resource, and the uplink transmission parameter(s) correspond to the SRS resource contained in the SRS resource set triggered by the trigger signaling.

In one embodiment, the processor 602 is further configured to:

receive a spatial related parameter from the base station via the transceiver 603, the spatial related parameter is used to indicate information used by the terminal to determine an uplink sending beam sending the SRS, and the SRSs are an SRS corresponding to the SRS resource in the SRS resource set;

one SRS resource corresponds to one spatial related parameter, or one SRS resource set corresponds to one spatial related parameter.

In one embodiment, different SRS resource sets correspond to different spatial related parameters;

and/or, different SRS resources in one SRS resource set correspond to different spatial related parameters.

In one embodiment, the spatial related parameter includes a sending beam index;

or, the spatial related parameter includes a spatial reference signal identifier which is used to indicate a reference signal used by the terminal to determine the uplink sending beam sending the SRS;

or, the spatial related parameter includes a spatial reference signal index which is used to indicate a reference signal used by the terminal to determine the uplink sending beam sending the SRS.

In one embodiment, the uplink transmission parameter(s) include at least one of:

Transmitted Precoding Matrix Indicator (TPMI);
Transmitted Rank Indicator (TRI);
SRS Resource Indicator (SRI);
SRS resource set indicator.

In one embodiment, the processor 602 is configured to:

receive the first DCI carrying the uplink transmission parameter(s) from the base station via the transceiver 603;

or, receive the first RRC signaling carrying the uplink transmission parameter(s) from the base station via the transceiver 603.

In one embodiment, the processor 602 is further configured to:
receive the second DCI carrying the SRS resource set indicator from the base station or receive the second RRC signaling carrying the SRS resource set indicator from the base station via the transceiver 603;
determine an SRS resource set, corresponding to the first uplink signal and/or the uplink transmission parameter(s), according to the SRS resource set indicator;
the SRS resource set indicator is used to indicate an SRS resource set corresponding to the uplink transmission parameter(s), and the second DCI is the same as or different from the first DCI, and the second RRC signaling is the same as or different from the first RRC signaling.

In one embodiment, the processor 602 is further configured to:
determine an SRS corresponding to the uplink transmission parameter(s).

In one embodiment, the processor 602 is further configured to:
determine the number of coded bits of the TPMI and TRI according to the number of antenna ports contained in the SRS resource for determining the uplink transmission parameter(s).

In one embodiment, the processor 602 is further configured to:
if all SRS resources in the at least two SRS resource sets contain the same number of antenna ports, determine the number of coded bits of the TPMI and TRI according to the number of antenna ports.

In one embodiment, the processor 602 is further configured to:
if there are SRS resources containing different numbers of antenna ports in the at least two SRS resource sets, determine the number of coded bits of the TPMI and TRI according to the maximum value of the numbers of antenna ports contained in all SRS resources in the at least two SRS resource sets;
or
if there are SRS resources containing different numbers of antenna ports in an SRS resource set corresponding to the SRS sent by the terminal, determine the number of coded bits of the TPMI and TRI according to the maximum value of the numbers of antenna ports contained in all SRS resources in the SRS resource set corresponding to the received SRS sent by the terminal.

In one embodiment, the processor 602 is further configured to:
determine the SRI according to the number of SRS resources contained in the SRS resource set for determining the uplink transmission parameter(s).

In one embodiment, the processor 602 is further configured to:
if all SRS resource sets in the at least two SRS resource sets contain the same number of SRS resources, determine the number of coded bits of the SRI according to the number of SRS resources.

In one embodiment, the processor 602 is further configured to:
if there are SRS resource sets containing different numbers of SRS resources in the at least two SRS resource sets, determine the number of coded bits of the SRI according to the maximum value of the numbers of SRS resources contained in all SRS resource sets among the at least two SRS resource sets.

In one embodiment, the processor 602 is further configured to:
determine the number of coded bits of the uplink transmission parameter(s);
decode the uplink transmission parameter(s) according to the number of coded bits to obtain the TPMI and TRI or obtain the TPMI, TRI and SRI.

In one embodiment, the processor 602 is further configured to:
determine the precoding of the first uplink signal according to the SRS;
send the first uplink signal to the base station according to the determined precoding.

In one embodiment, the processor 602 is configured to:
determine the precoding of the first uplink signal according to the SRS and the uplink transmission parameter(s).

In one embodiment, the processor 602 is further configured to:
determine a transmitting antenna of the first uplink signal according to the SRS;
send the first uplink signal to the base station by using the determined transmitting antenna.

In one embodiment, the processor 602 is configured to:
send the first uplink signal to the base station by the first analog beamforming, and the first analog beamforming is the same as the analog beamforming used when sending the SRS corresponding to the uplink transmission parameter(s).

Here, in FIG. 6, the bus architecture may include any numbers of interconnected buses and bridges, and specifically link various circuits of one or more processors represented by the processor 602 and the memory represented by the memory 601. The bus architecture may further link various other circuits such as peripheral device, voltage regulator and power management circuit, which are all well known in the art and thus will not be further described again herein. The bus interface provides an interface. The transceiver 603 may be a plurality of elements, i.e., include a transmitter and a receiver, and provide the devices for communicating with various other devices over the transmission media. The processor 602 is responsible for managing the bus architecture and general processing, and the memory 601 may store the data used by the processor 602 when performing the operations.

In one embodiment, the memory 601 may include a Read Only Memory (ROM), a Random Access Memory (RAM), and a magnetic disk memory. The memory 601 is used to store the data required by the processor 602 when running, that is, store the instructions that can be executed by at least one processor 602. The at least one processor 602 performs the uplink transmission instruction method provided by the embodiment shown in FIG. 1 by executing the instructions stored in the memory 601. Here, the number of memories 601 is one or more. Here, the memory 601 is shown together in FIG. 6, but it should be known that the memory 601 is not a mandatory functional device, so it is shown by broken lines in FIG. 6.

Figure 7:
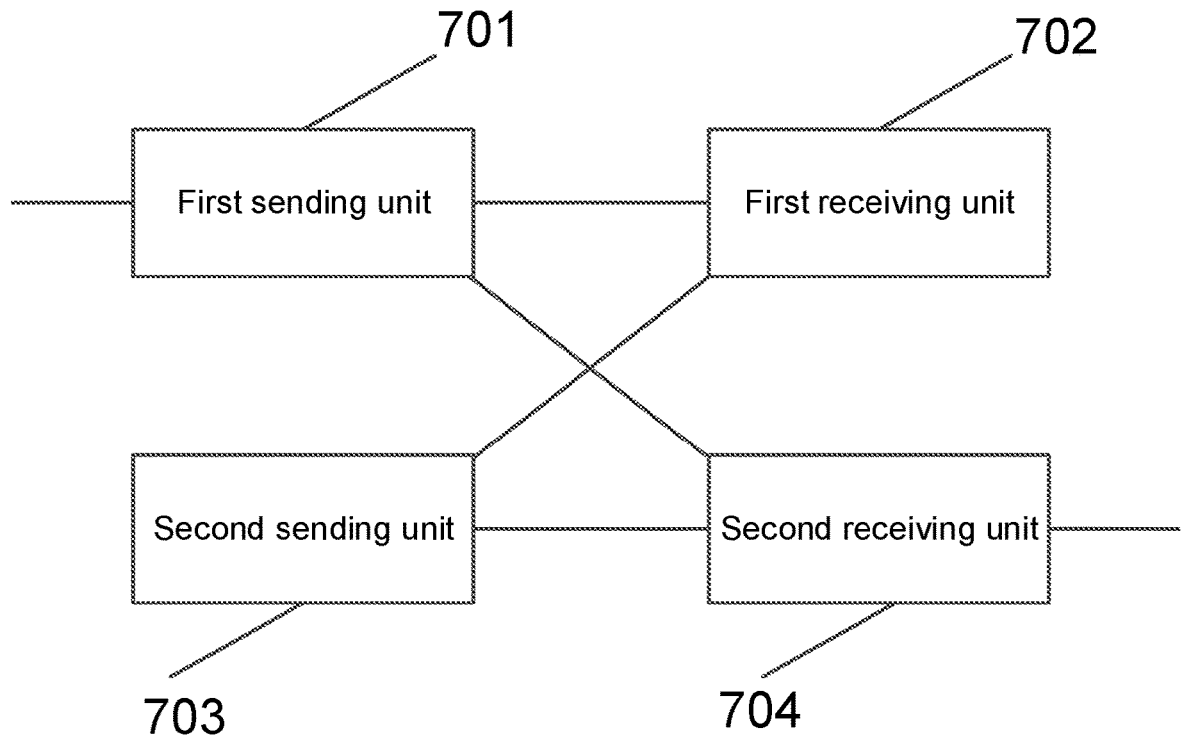
FIG. 7 is a structural schematic diagram of a terminal provided by an embodiment of the invention.

Referring to FIG. 7, based on the same inventive concept, an embodiment of the application provides a terminal, which includes a first receiving device 702, a first sending device 701, a second receiving device 704 and a second sending device 703. Here, the first receiving device 702 is configured to receive a configuration message from a base station, the configuration message is used for configuring at least two SRS resource sets for the terminal, and the SRS resource sets are used for acquiring the CSI of an uplink signal in a first uplink transmission mode. The first sending device 701 is configured to send an SRS based on the configuration message to the base station. The second receiving device 704 is configured to receive uplink transmission parameter(s) determined according to the SRS from the base station. The second sending device 703 is configured to send a first uplink signal to the base station according to the uplink transmission parameter(s).

In one embodiment, the first receiving device 702 is further configured to:
 receive the trigger signaling from the base station and send the SRS to the base station according to the configuration message and the trigger signaling, the trigger signaling is used to trigger the terminal to send the SRS based on a configuration message of at least one SRS resource set in aperiodic SRS resource sets and/or semi-persistent SRS resource sets configured by the configuration message.

In one embodiment, the trigger signaling is used to trigger one SRS resource set, or the trigger signaling is used to trigger one SRS resource in one SRS resource set.

In one embodiment, one SRS resource set contains one SRS resource, and the uplink transmission parameter(s) correspond to the SRS resource included in the SRS resource set triggered by the trigger signaling.

In one embodiment, the first receiving device 702 is further configured to:
 receive a spatial related parameter from the base station, the spatial related parameter is used to indicate information used by the terminal to determine an uplink sending beam sending the SRS, and the SRS is an SRS corresponding to the SRS resource in the SRS resource set;
 one SRS resource corresponds to one spatial related parameter, or one SRS resource set corresponds to one spatial related parameter.

In one embodiment, different SRS resource sets correspond to different spatial related parameters;
and/or,
 different SRS resources in one SRS resource set correspond to different spatial related parameters.

In one embodiment, the spatial related parameter includes a sending beam index;
 or, the spatial related parameter includes a spatial reference signal identifier which is used to indicate a reference signal used by the terminal to determine the uplink sending beam sending the SRS;
 or, the spatial related parameter includes a spatial reference signal index which is used to indicate a reference signal used by the terminal to determine the uplink sending beam sending the SRS.

In one embodiment, the uplink transmission parameter(s) contain at least one of:
 Transmitted Precoding Matrix Indicator (TPMI);
 Transmitted Rank Indicator (TRI);
 SRS Resource Indicator (SRI);
 SRS resource set indicator.

In one embodiment, the first receiving device 702 is specifically configured to:
 receive the first DCI carrying the uplink transmission parameter(s) from the base station;
 or, receive the first RRC signaling carrying the uplink transmission parameter(s) from the base station.

In one embodiment, the first receiving device 702 is further configured to:
 receive the second DCI carrying the SRS resource set indicator from the base station, or receive the second RRC signaling carrying the SRS resource set indicator from the base station;
 determine an SRS resource set, corresponding to the first uplink signal and/or the uplink transmission parameter(s), according to the SRS resource set indicator;
 the SRS resource set indicator is used to indicate an SRS resource set corresponding to the uplink transmission parameter(s), and the second DCI is the same as or different from the first DCI, and the second RRC signaling is the same as or different from the first RRC signaling.

In one embodiment, the second receiving device 704 is further configured to:
 determine an SRS corresponding to the uplink transmission parameter(s).

In one embodiment, the second receiving device 704 is further configured to:
 determine the number of coded bits of the TPMI and TRI according to the number of antenna ports included in the SRS resource for determining the uplink transmission parameter(s).

In one embodiment, the second receiving device 704 is further configured to:
 if all SRS resources in the at least two SRS resource sets include the same number of antenna ports, determine the number of coded bits of the TPMI and TRI according to the number of antenna ports.

In one embodiment, the second receiving device 704 is further configured to:
 if there are SRS resources including different numbers of antenna ports in the at least two SRS resource sets, determine the number of coded bits of the TPMI and TRI according to the maximum value of the numbers of antenna ports included in all SRS resources in the at least two SRS resource sets;
 or
 if there are SRS resources including different numbers of antenna ports in an SRS resource set corresponding to the SRS sent by the terminal, determine the number of coded bits of the TPMI and TRI according to the maximum value of the numbers of antenna ports included in all SRS resources in the SRS resource set corresponding to the received SRS sent by the terminal.

In one embodiment, the second receiving device 704 is further configured to:
 determine the SRI according to the number of SRS resources included in the SRS resource set for determining the uplink transmission parameter(s).

In one embodiment, the second receiving device 704 is further configured to:
 if all SRS resource sets in the at least two SRS resource sets include the same number of SRS resources, determine the number of coded bits of the SRI according to the number of SRS resources.

In one embodiment, the second receiving device 704 is further configured to:
 if there are SRS resource sets including different numbers of SRS resources in the at least two SRS resource sets, determine the number of coded bits of the SRI according to the maximum value of the numbers of SRS resources included in all SRS resource sets among the at least two SRS resource sets.

In one embodiment, the second receiving device 704 is further configured to:

determine the number of coded bits of the uplink transmission parameter(s);

decode the uplink transmission parameter(s) according to the number of coded bits to obtain the TPMI and TRI or obtain the TPMI, TRI and SRI.

In one embodiment, the second receiving device 704 is further configured to:

determine the precoding of the first uplink signal according to the SRS;

send the first uplink signal to the base station according to the determined precoding.

In one embodiment, the second receiving device 704 is configured to:

determine the precoding of the first uplink signal according to the SRS and the uplink transmission parameter(s).

In one embodiment, the second receiving device 704 is further configured to:

determine a transmitting antenna of the first uplink signal according to the SRS;

send the first uplink signal to the base station by using the determined transmitting antenna.

In one embodiment, the second sending device 703 is specifically configured to:

send the first uplink signal to the base station by the first analog beamforming, and the first analog beamforming is the same as the analog beamforming used when sending the SRS corresponding to the uplink transmission parameter(s).

Here, the physical devices corresponding to the first receiving device 702, the first sending device 701, the second receiving device 704 and the second sending device 703 may all be the aforementioned processor 602 or transceiver 603. The base station can be used to perform the uplink transmission instruction method provided in the embodiment shown in FIG. 1. Therefore, for the functions that can be implemented by the functional devices in the device, the reference may be made to the corresponding description in the embodiment shown in FIG. 1, which will not be repeated.

Based on the same inventive concept, an embodiment of the application further provides a computer storage medium, the computer storage medium stores computer instructions. When the computer instructions run on a computer, the uplink transmission instruction method provided by the embodiment shown in FIG. 1 is performed.

The uplink transmission instruction method, terminal and network side device provided in the embodiments of the application can be applied in a wireless communication system. Although the 3GPP NR system is taken as an example to illustrate various embodiments in the application, the applicable communication systems include but not limited to: 5G system or its evolved system, other Orthogonal Frequency Division Multiplexing (OFDM)-based systems, DFT-S-OFDM (DFT-Spread OFDM)-based systems, Evolved Long Term Evolution (eLTE) system, etc. In practical applications, the connections among the above devices may be wireless connections or wired connections.

It should be noted that the above communication system may include multiple terminals, and the network-side device may communicate (transmit signaling or data) with multiple terminals.

The network-side device provided by the embodiments of the application may be a base station that may be a commonly-used base station or an evolved Node B (eNB), or a network-side device (for example, next generation node base station (gNB) or transmitting and receiving point (Transmission Reception Point (TRP))) or a cell in the 5G system, etc.

The terminal provided in the embodiments of the application may be a mobile phone, a tablet computer, a notebook computer, an Ultra-Mobile Personal Computer (UMPC), a netbook, a wearable device, a vehicle-mounted device, or a Personal Digital Assistant (Personal Digital Assistant (PDA)), etc. It should be noted that the specific type of the terminal is not limited in the embodiments of the application.

It should be understood that the terminal is also called User Equipment (UE), Mobile Station (MS), Mobile Terminal (MT), etc., and is a device for providing the voice and/or data connectivity to the user, e.g., a handheld device with the wireless connection function, a vehicle-carried device, etc. At present, some examples of the terminal are: mobile phone, tablet, laptop, palmtop computer, Mobile Internet Device (MID), wearable device, Virtual Reality (VR) device, Augmented Reality (AR) equipment, wireless terminal in the industrial control, wireless terminal in the self driving, wireless terminal in the remote medical surgery, and wireless terminal in the smart grid, wireless terminal in the transportation safety, wireless terminal in the smart city, wireless terminal in the smart home, etc.

The network-side device herein may be a node (or device) in the Radio Access Network (RAN), and may also be called base station. At present, the examples of some RAN nodes are: gNB, transmission reception point (Transmission on Reception Point, TRP), evolved Node B (eNB), Radio Network Controller (RNC), Node B (NB), Base Station Controller (BSC), Base Transceiver Station (BTS), home base station (for example, home evolved NodeB or Home Node B (HNB)), Base Band Device (BBU), or Wireless Fidelity (Wifi) Access Point (AP), etc. Furthermore, in a network structure, the RAN may include a Centralized Device (CU) node and a Distributed Device (DU) node.

In some possible embodiments, various aspects of the uplink transmission instruction method, base station and terminal provided by the application can also be implemented in the form of a program product, which includes program codes. When the program product runs on a computer device, the program codes are configured to cause the computer device to perform the steps in the method for selecting the configuration information according to various exemplary embodiments of the application described above in this specification, for example, the computer device may perform the uplink transmission instruction method provided by the embodiment as shown in FIG. 1.

The program product can use any combination of one or more readable media. The readable medium may be a readable signal medium or a readable storage medium. The readable storage medium may be, for example but not limited to, electrical, magnetic, optical, electromagnetic, infrared, or semiconductor system, apparatus or device, or any combination thereof. More specific examples of the readable storage media (non-exhaustive list) include: electrical connection with one or more wires, portable disk, hard disk, Random Access Memory (RAM), Read Only Memory (ROM), Erasable Programmable Read Only Memory (EPROM) or flash memory, optical fiber, portable Compact Disk-Read Only Memory (CD-ROM), optical storage device, magnetic storage device, or any suitable combination thereof.

The program product for the AMF selection method of the embodiment of the invention may adopt a portable Compact Disk-Read Only Memory (CD-ROM) and include program codes, and may be run on a computing device. However, the program product of the invention is not limited to this. In this document, the readable storage medium can be any tangible medium that contains or stores a program, where the program can be used by or used in combination with the instruction execution system, apparatus or device.

The readable signal medium may include data signals propagated in the baseband or as a part of carrier waves, and the readable program codes are beared therein. Such propagated data signals can be in many forms, including but not limited to electromagnetic signals, optical signals, or any suitable combination thereof. The readable signal medium may also be any readable medium other than the readable storage medium, and the readable medium may send, propagate or transmit the programs used by or used in combination with the instruction execution system, apparatus or device.

The program codes contained on the readable medium can be transmitted by any suitable medium, including but not limited to wireless, wired, optical cable, RF, etc., or any suitable combination thereof.

The program codes for performing the operations of the invention can be compiled in any combination of one or more programming languages, where the programming languages include the object-oriented programming languages such as Java, C++, etc., and also include the conventional procedural programming languages such as "C" language or similar programming languages. The program codes can be executed entirely on a user computing device, executed partly on a user computing device, executed as an independent software package, executed partly on a user computing device and partly on a remote computing device, or executed entirely on a remote computing device or server. In the case of a remote computing device, the remote computing device can be connected to the user computing device through any kind of network including Local Area Network (LAN) or Wide Area Network (WAN), or can be connected to an external computing device (for example, using the Internet service provider to connect via the Internet).

It should be noted that several devices or subdevices of the apparatuses are mentioned in the above detailed description, but such division is only exemplary and not mandatory. In fact, according to the embodiments of the invention, the features and functions of two or more devices described above may be embodied in one device. Conversely, the features and functions of one device described above may be further divided into multiple devices to be embodied.

In addition, although the operations of the method of the invention are described in a specific order in the drawings, this does not require or imply that these operations must be performed in the specific order or that all the operations shown must be performed to achieve the desired result. Additionally or alternatively, some steps may be omitted, multiple steps may be combined into one step for execution, and/or one step may be decomposed into multiple steps for execution.

Embodiments of the invention can provide methods, systems and computer program products. Thus, the invention can take the form of hardware embodiments alone, software embodiments alone, or embodiments combining the software and hardware aspects. Also the invention can take the form of computer program products implemented on one or more computer usable storage mediums (including but not limited to magnetic disk memories, CD-ROMs, optical memories and the like) containing computer usable program codes therein.

The invention is described by reference to the flow charts and/or the block diagrams of the methods, the devices (systems) and the computer program products according to the embodiments of the invention. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. An uplink transmission instruction method, comprising:

sending a configuration message to a terminal, wherein the configuration message is for configuring at least two Sounding Reference Signal, SRS, resource sets for the terminal, and the SRS resource sets are for acquiring Channel State Information, CSI, of an uplink signal in a first uplink transmission mode;

receiving an SRS, based on the configuration message, transmitted by the terminal, and determining an uplink transmission parameter of a first uplink signal according to the received SRS;

sending the determined uplink transmission parameter to the terminal and instructing the terminal to transmit the first uplink signal according to the uplink transmission parameter;

wherein one or a combination of following schemes is performed:

scheme I: the uplink transmission parameter comprises TPMI and TRI, and before sending the determined uplink transmission parameter to the terminal, the method further comprises:

determining the number of coded bits of the TPMI and TRI according to the number of antenna ports of a SRS resource for determining the uplink transmission parameter;

scheme II: the uplink transmission parameter comprises TPMI and TRI, all SRS resources in the at least two SRS resource sets comprise the same number of antenna ports, and before sending the determined uplink transmission parameter to the terminal, the method further comprises:

determining the number of coded bits of the TPMI and TRI according to the number of antenna ports;

scheme III: the uplink transmission parameter comprises TPMI and TRI, there are SRS resources comprising different numbers of antenna ports in the at least two SRS resource sets, and before sending the determined uplink transmission parameter to the terminal, the method further comprises:

determining the number of coded bits of the TPMI and TRI according to a maximum value of the numbers of antenna ports comprised in all SRS resources in the at least two SRS resource sets;

or the uplink transmission parameter comprises TPMI and TRI, there are SRS resources comprising different numbers of antenna ports in an SRS resource set corresponding to the received SRS transmitted by the terminal, and before sending the determined uplink transmission parameter to the terminal, the method further comprises:

determining the number of coded bits of the TPMI and TRI according to a maximum value of the numbers of antenna ports comprised in all SRS resources in the SRS resource set corresponding to the received SRS transmitted by the terminal;

scheme IV: the uplink transmission parameter comprises SRI, and before sending the determined uplink transmission parameter to the terminal, the method further comprises:

determining the SRI according to the number of SRS resources comprised in a SRS resource set for determining the uplink transmission parameter;

scheme V: the uplink transmission parameter comprises SRI, all SRS resource sets in the at least two SRS resource sets comprise the same number of SRS resources, and before sending the determined uplink transmission parameter to the terminal, the method further comprises:

determining the number of coded bits of the SRI according to the number of SRS resources;

scheme VI: the uplink transmission parameter comprises SRI, there are SRS resource sets comprising different numbers of SRS resources in the at least two SRS resource sets, and before sending the determined uplink transmission parameter to the terminal, the method further comprises:

determining the number of coded bits of the SRI according to a maximum value of the numbers of SRS resources comprised in all SRS resource sets among the at least two SRS resource sets.

2. The method of claim 1, wherein the at least two SRS resource sets comprise an aperiodic SRS resource set or a semi-persistent SRS resource set, the method further comprises:

sending a trigger signaling to the terminal, wherein the trigger signaling is for triggering the terminal to send the SRS based on a configuration message of at least one SRS resource set in the aperiodic SRS resource set and/or semi-persistent SRS resource set.

3. The method of claim 1, further comprising:

sending a spatial related parameter to the terminal, wherein the spatial related parameter is used to indicate information for determining an uplink sending beam of the SRS, and the SRS is an SRS corresponding to SRS resources in the SRS resource sets;

wherein one SRS resource corresponds to one spatial related parameter, or one SRS resource set corresponds to one spatial related parameter.

4. The method of claim 3, wherein, the spatial related parameter comprises a sending beam index;

or, the spatial related parameter comprises a spatial reference signal identifier used to indicate a reference signal for determining the uplink sending beam of the SRS;

or, the spatial related parameter comprises a spatial reference signal index used to indicate a reference signal for determining the uplink sending beam of the SRS.

5. The method of claim 2, wherein the determining an uplink transmission parameter of a first uplink signal according to the received SRS, comprises:

the most recently-triggered SRS resource is an aperiodic SRS resource, determining the uplink transmission parameter according to an SRS corresponding to the most recently-triggered SRS resource;

or, the most recently-triggered SRS resource set is an aperiodic SRS resource set, determining the uplink transmission parameter according to an SRS corresponding to the most recently-triggered SRS resource set;

or, the most recently-triggered SRS resource is a semi-persistent SRS resource, determining the uplink transmission parameter according to an SRS, corresponding to the most recently-triggered SRS resource and transmitted by the terminal most recently;

or, the most recently-triggered SRS resource set is a semi-persistent SRS resource set, determining the uplink transmission parameter according to an SRS, corresponding to the most recently-triggered SRS resource set and transmitted by the terminal most recently;

or, the trigger signaling comprises trigger information for triggering aperiodic SRS resources, determining the uplink transmission parameter according to an SRS corresponding to the most recently-triggered aperiodic SRS resource;

or, the trigger signaling comprises trigger information for triggering aperiodic SRS resource sets, determining the uplink transmission parameter according to an SRS corresponding to the most recently-triggered aperiodic SRS resource set;

or, the trigger signaling comprises trigger information for triggering semi-persistent SRS resources, determining the uplink transmission parameter according to an SRS, corresponding to the most recently-triggered semi-persistent SRS resource and transmitted by the terminal most recently;

or, the trigger signaling comprises trigger information for triggering semi-persistent SRS resource sets, determining the uplink transmission parameter according to an SRS, corresponding to the most recently-triggered semi-persistent SRS resource set and transmitted by the terminal most recently.

6. The method of claim 1, wherein the sending the determined uplink transmission parameter to the terminal, comprises:

sending first DCI carrying the uplink transmission parameter to the terminal; or, sending first RRC signaling carrying the uplink transmission parameter to the terminal;
and wherein the method further comprises:
sending SRS resource set indicator to the terminal through second DCI or second RRC signaling, wherein the SRS resource set indicator indicates an SRS resource set corresponding to the uplink transmission parameter, the second DCI is the same as or different from the first DCI, and the second RRC signaling is the same as or different from the first RRC signaling.

7. The method of claim 1, wherein the uplink transmission parameter comprises at least one of:
Transmitted Precoding Matrix Indicator, TPMI;
Transmitted Rank Indicator, TRI;
SRS Resource Indicator, SRI;
SRS resource set indicator;
and wherein the method further comprises:
determining the number of coded bits of the SRS resource set indicator according to the number of SRS resource sets, wherein the number of SRS resource sets is at least one of:
the number of the at least two SRS resource sets;
the number of SRS resource sets with a specific time-domain behavior type in the at least two SRS resource sets, wherein the specific time-domain behavior type is at least one of periodic, aperiodic and semi-persistent;
the number of SRS resource sets corresponding to all SRSs of the configuration message;
the number of SRS resource sets with a specific time-domain behavior type in SRS resource sets corresponding to all SRSs of the configuration message, wherein the specific time-domain behavior type is at least one of periodic, aperiodic and semi-persistent;
the number of SRS resource sets corresponding to SRS resources with a specific time-domain behavior type among all SRS resources corresponding to all SRSs of the configuration message, wherein the specific time-domain behavior type is at least one of periodic, aperiodic and semi-persistent.

8. A base station, comprising:
a memory configured to store instructions;
a processor configured to read the instructions in the memory to perform the method of claim 1.

9. An uplink transmission instruction method, comprising:
receiving a configuration message from a base station, wherein the configuration message is for configuring at least two Sounding Reference Signal, SRS, resource sets for a terminal, and the SRS resource set is for acquiring Channel State Information, CSI, of an uplink signal in a first uplink transmission mode;
sending an SRS based on the configuration message to the base station;
receiving an uplink transmission parameter determined by the base station according to the SRS; and
sending a first uplink signal to the base station according to the uplink transmission parameter;
wherein one or a combination of following schemes is performed:
scheme I: the uplink transmission parameter comprises TPMI and TRI, and after receiving the uplink transmission parameter determined by the base station according to the SRS, the method further comprises:
determining the number of coded bits of the TPMI and TRI according to the number of antenna ports of a SRS resource for determining the uplink transmission parameter;
scheme II: the uplink transmission parameter comprises TPMI and TRI, all SRS resources in the at least two SRS resource sets comprise the same number of antenna ports, and after receiving the uplink transmission parameter determined by the base station according to the SRS, the method further comprises:
determining the number of coded bits of the TPMI and TRI according to the number of antenna ports;
scheme III: the uplink transmission parameter comprises TPMI and TRI, there are SRS resources comprising different numbers of antenna ports in the at least two SRS resource sets, and after receiving the uplink transmission parameter determined by the base station according to the SRS, the method further comprises:
determining the number of coded bits of the TPMI and TRI according to a maximum value of the numbers of antenna ports comprised in all SRS resources in the at least two SRS resource sets;
or
the uplink transmission parameter comprises TPMI and TRI, there are SRS resources comprising different numbers of antenna ports in an SRS resource set corresponding to the SRS transmitted by the terminal, and after receiving the uplink transmission parameter determined by the base station according to the SRS, the method further comprises:
determining the number of coded bits of the TPMI and TRI according to a maximum value of the numbers of antenna ports comprised in all SRS resources in the SRS resource set corresponding to the received SRS transmitted by the terminal;
scheme IV: the uplink transmission parameter comprises SRI, and after receiving the uplink transmission parameter determined by the base station according to the SRS, the method further comprises:
determining the SRI according to the number of SRS resources comprised in a SRS resource set for determining the uplink transmission parameter;
scheme V: the uplink transmission parameter comprises SRI, all SRS resource sets in the at least two SRS resource sets comprise the same number of SRS resources, and after receiving the uplink transmission parameter determined by the base station according to the SRS, the method further comprises:
determining the number of coded bits of the SRI according to the number of SRS resources;
scheme VI: the uplink transmission parameter comprises SRI, there are SRS resource sets comprising different numbers of SRS resources in the at least two SRS resource sets, and after receiving the uplink transmission parameter determined by the base station according to the SRS, the method further comprises:
determining the number of coded bits of the SRI according to a maximum value of the numbers of SRS resources comprised in all SRS resource sets among the at least two SRS resource sets.

10. The method of claim 9, wherein the sending an SRS based on the configuration message to the base station comprises:
receiving trigger signaling from the base station, and sending the SRS to the base station according to the configuration message and the trigger signaling, wherein the trigger signaling is for triggering the terminal to send the SRS based on a configuration message of at least one SRS resource set in an aperiodic SRS resource set and/or a semi-persistent SRS resource set.

11. The method of claim 9, further comprising:
receiving a spatial related parameter from the base station, wherein the spatial related parameter indicates information for determining an uplink sending beam of the SRS, and the SRS is an SRS corresponding to SRS resources in the SRS resource sets;
wherein one SRS resource corresponds to one spatial related parameter, or one SRS resource set corresponds to one spatial related parameter.

12. The method of claim 11, wherein,
the spatial related parameter comprises a sending beam index;
or, the spatial related parameter comprises a spatial reference signal identifier used to indicate a reference signal for determining the uplink sending beam of the SRS;
or, the spatial related parameter comprises a spatial reference signal index used to indicate a reference signal for determining the uplink sending beam of the SRS.

13. The method of claim 9, wherein the receiving the uplink transmission parameter determined by the base station according to the SRS, comprises:
receiving first DCI carrying the uplink transmission parameter from the base station;
or, receiving first RRC signaling carrying the uplink transmission parameter from the base station.

14. The method of claim 13, wherein the receiving the uplink transmission parameter determined by the base station according to the SRS, comprises:
receiving second DCI carrying SRS resource set indicator from the base station, or receiving second RRC signaling carrying SRS resource set indicator from the base station;
determining an SRS resource set, corresponding to the first uplink signal and/or the uplink transmission parameter, according to the SRS resource set indicator;
wherein the SRS resource set indicator indicates an SRS resource set corresponding to the uplink transmission parameter, and the second DCI is the same as or different from the first DCI, and the second RRC signaling is the same as or different from the first RRC signaling.

15. The method of claim 9, wherein after receiving the uplink transmission parameter determined by the base station according to the SRS, the method further comprises:
determining an SRS corresponding to the uplink transmission parameter; and/or
determining the number of coded bits of the uplink transmission parameter; and decoding the uplink transmission parameter according to the number of coded bits to obtain TPMI and TRI or obtain TPMI, TRI and SRI.

16. The method of claim 15, further comprising:
determining precoding of the first uplink signal according to the SRS;
sending the first uplink signal to the base station according to the determined precoding.

17. The method of claim 15, further comprising:
determining a transmitting antenna of the first uplink signal according to the SRS;
sending the first uplink signal to the base station by using the determined transmitting antenna.

18. A terminal, comprising:
a memory configured to store instructions;
a processor configured to read the instructions in the memory to:
receive a configuration message from a base station via a transceiver, wherein the configuration message is for configuring at least two Sounding Reference Signal, SRS, resource sets for a terminal, and the SRS resource set is for acquiring Channel State Information, CSI, of an uplink signal in a first uplink transmission mode;
send an SRS based on the configuration message to the base station;
receive an uplink transmission parameter determined by the base station according to the SRS;
send a first uplink signal to the base station according to the uplink transmission parameter; and
the transceiver configured to receive and send data under control of the processor;
wherein the processor is further configured to perform one or a combination of following schemes:
scheme I: the uplink transmission parameter comprises TPMI and TRI, and after receiving the uplink transmission parameter determined by the base station according to the SRS, the processor is further configured to perform:
determining the number of coded bits of the TPMI and TRI according to the number of antenna ports of a SRS resource for determining the uplink transmission parameter;
scheme II: the uplink transmission parameter comprises TPMI and TRI, all SRS resources in the at least two SRS resource sets comprise the same number of antenna ports, and after receiving the uplink transmission parameter determined by the base station according to the SRS, the processor is further configured to perform:
determining the number of coded bits of the TPMI and TRI according to the number of antenna ports;
scheme III: the uplink transmission parameter comprises TPMI and TRI, there are SRS resources comprising different numbers of antenna ports in the at least two SRS resource sets, and after receiving the uplink transmission parameter determined by the base station according to the SRS, the processor is further configured to perform:
determining the number of coded bits of the TPMI and TRI according to a maximum value of the numbers of antenna ports comprised in all SRS resources in the at least two SRS resource sets;
or
the uplink transmission parameter comprises TPMI and TRI, there are SRS resources comprising different numbers of antenna ports in an SRS resource set corresponding to the SRS transmitted by the terminal, and after receiving the uplink transmission parameter determined by the base station according to the SRS, the processor is further configured to perform:
determining the number of coded bits of the TPMI and TRI according to a maximum value of the numbers of antenna ports comprised in all SRS resources in the SRS resource set corresponding to the received SRS transmitted by the terminal;
scheme IV: the uplink transmission parameter comprises SRI, and after receiving the uplink transmission parameter determined by the base station according to the SRS, the processor is further configured to perform:

determining the SRI according to the number of SRS resources comprised in a SRS resource set for determining the uplink transmission parameter;

scheme V: the uplink transmission parameter comprises SRI, all SRS resource sets in the at least two SRS resource sets comprise the same number of SRS resources, and after receiving the uplink transmission parameter determined by the base station according to the SRS, the processor is further configured to perform:

determining the number of coded bits of the SRI according to the number of SRS resources;

scheme VI: the uplink transmission parameter comprises SM, there are SRS resource sets comprising different numbers of SRS resources in the at least two SRS resource sets, and after receiving the uplink transmission parameter determined by the base station according to the SRS, the processor is further configured to perform:

determining the number of coded bits of the SRI according to a maximum value of the numbers of SRS resources comprised in all SRS resource sets among the at least two SRS resource sets.

* * * * *